(12) United States Patent
Grimberg

(10) Patent No.: US 7,881,995 B2
(45) Date of Patent: Feb. 1, 2011

(54) SYSTEMS AND METHODS FOR OBJECTIVE FINANCING OF ASSETS

(75) Inventor: Robertus Grimberg, Smith's (BM)

(73) Assignee: Capital Tool Company (BM)

( * ) Notice: Subject to any disclaimer, the term of this patent is extended or adjusted under 35 U.S.C. 154(b) by 1322 days.

(21) Appl. No.: 10/882,166

(22) Filed: Jul. 2, 2004

(65) Prior Publication Data

US 2006/0015421 A1     Jan. 19, 2006

(51) Int. Cl.
*G06Q 40/00* (2006.01)
(52) U.S. Cl. .................. 705/35; 705/36 R; 705/37; 705/38
(58) Field of Classification Search .............. 705/35, 705/36 R, 37, 38, 39
See application file for complete search history.

(56) References Cited

U.S. PATENT DOCUMENTS

| | | | |
|---|---|---|---|
| 4,774,664 A | | 9/1988 | Campbell et al. |
| 5,704,045 A | * | 12/1997 | King et al. .................. 705/35 |
| 5,732,400 A | | 3/1998 | Mandler et al. |
| 6,021,397 A | | 2/2000 | Jones et al. |
| 6,035,287 A | | 3/2000 | Stallaert et al. |
| 6,073,104 A | | 6/2000 | Field |
| 6,078,903 A | | 6/2000 | Kealhofer |
| 6,095,413 A | * | 8/2000 | Tetro et al. .................. 235/380 |
| 6,154,730 A | | 11/2000 | Adams et al. |
| 6,360,210 B1 | * | 3/2002 | Wallman .................. 705/36 R |
| 6,430,542 B1 | * | 8/2002 | Moran ...................... 705/36 R |
| 6,456,982 B1 | * | 9/2002 | Pilipovic .................. 705/36 R |
| 2003/0018563 A1 | | 1/2003 | Kilgour et al. |
| 2003/0050884 A1 | * | 3/2003 | Barnett .................... 705/35 |
| 2003/0208431 A1 | * | 11/2003 | Raynes et al. .............. 705/36 |

FOREIGN PATENT DOCUMENTS

WO     WO 00/54186     9/2000

OTHER PUBLICATIONS

Xin, Zhang, The emergence of project-backed securitization, International Financial Law Review v19n1 pp. 24-29, Jan. 2000.*
Howcroft, Barry; Fadhley, Sabah, Project finance: A credit strategy based on contractual linkages, Service Industries Journal v18n2 pp: 90-111, Apr. 1998.*
Bronsard et al., "Toward Software Plug-and-Play," Proceedings of the 1997 Symposium on Software Reusability, 1997, XP002407179 retrieved from the internet: <<http://portal.acm.org/citation.cfm?id=258366.258379>>, (retrieved on Nov. 13, 2006), pp. 19-29.
Int'l Search Report and Written Opinion for Int'l Appl. No. PCT/IB2005/004120 mailed Nov. 24, 2006, (11 pages).

\* cited by examiner

*Primary Examiner*—Charles R Kyle
*Assistant Examiner*—Seth Weis
(74) *Attorney, Agent, or Firm*—Finnegan, Henderson, Farabow, Garrett & Dunner, LLP

(57) ABSTRACT

Systems, methods, and computer program products consistent with the principles of the present invention provide an infrastructure for asset owners to obtain financing arrangements from a multitude of liability providers in near real time and objectively.

32 Claims, 16 Drawing Sheets

SYSTEMS AND METHODS FOR OBJECTIVE FINANCING OF ASSETS

FIELD OF THE INVENTION

The present invention generally relates to the field of finance and to computerized systems and methods for facilitating the financing of assets. More particularly, the invention relates to systems and methods for optimizing the financing, insurance, and/or hedging of portfolios of assets, such as trade receivables.

BACKGROUND OF THE INVENTION

Conventionally, when a customer comes to a financial institution, such as a bank, to request a financial product, the bank determines the risk associated with the customer and, based on the risk, assigns a financing limit to the customer and an associated price for the financial product. For instance, in the case of a company seeking a loan or line of credit, a bank may determine the risk associated with that company and determine a borrowing limit and a price, such as an interest rate, based on annual accounts, interviews, projections etc. Periodically, usually annually, or when triggered by special circumstances such as a default, the bank may review the risk, financing limit, and/or financing price and adjust the financing limit and price according to the results of the review.

To obtain a financial product, such as a loan, insurance or the like, a customer typically phones or otherwise informs the bank (e.g., using an online application on the Internet) of the financing parameters and the type of financial product needed. For example, in the case of a funding product, the parameters usually include an amount and a maturity date. Alternatively, in the case of debt insurance products, the parameters usually include a debtor identity and an advance ratio.

A customer may reduce the cost of a financial product by structuring the transaction arrangement in certain ways. For example, if the customer pledges as collateral, or sells, assets to the bank, then the bank will generally discount the price of the financial product because the bank's risk and/or costs are lowered by the arrangement. A true sale structure, for example, lowers the bank's costs because the bank has a more direct claim on the assets without having to resort to legal proceedings and other expensive remedies should the customer go into bankruptcy.

In a similar fashion, financial protection may be received in the world of insurance or corporate assets. Based on the risk associated with the underlying assets, insurers set the price and limit for protection of the assets, and the insurance purchaser has to show adherence to certain requirements for the insurance to remain in force. Risk hedging products are also similarly obtained and priced. For convenience, the term "liability instrument" will generally be used herein to refer to funding products, insurance products, and hedging products, interchangeably.

Conventionally, after entering into a financial product arrangement, the provider distributes at least a portion of its obligations to third parties, thereby lessening its exposure to loss. For example, a bank may search for an investor to buy portions of loan(s) that it has originated, sometimes using specialized financing vehicles such as conduits or structured notes, among others.

Current conventional financing techniques, however, present several problems for both providers and customers. One problem for funding and insurance providers is that financial product arrangements are based on information that grows more "stale" or out-of-date as time passes. Relevant developments subsequent to entering into the arrangement are not reflected in the arrangement until a periodic, typically annual, review is held or until a review-triggering event, such as a past due payment, occurs. Ideally, a provider would like to modify the arrangement when the risk associated with the arrangement changes, which is a continuous phenomenon. For example, if the risk associated with a borrowing company goes up, a bank would like to immediately decrease the size of the company's funding line and/or increase the price (e.g., the interest rate) to ensure the financing arrangement achieves a positive marked-to-market return. Instead, current conventionally structured financial products allow the customer to fully draw under its credit line, regardless of any relevant recent changes in the customer's risk profile. Accordingly, it is desirable to update the price and/or terms of financial products automatically and in near real time based on the latest information regarding market and customer specific issues and based on any change in risk to the provider financial institution. It is also desirable to update the price and/or terms of financial products based on changes in the risk associated with the selling or servicing company underlying an asset.

A related problem for financing and insurance providers is low transparency or visibility into the business performance of a customer, which keeps risk-relevant changes hidden from the financial product provider. For example, conventionally, companies provide earnings and operations reports quarterly, (and most provide only annual accounts), so a provider may not receive relevant information until it is over three months to one year old. Moreover, quarterly reports are often un-audited and, therefore, not as reliable a source of information as the audited yearly report. In addition, different companies use different accounting and auditing methods to report earnings and status, especially those based in developing countries, making it difficult at best for a provider to directly compare information among a group of customer companies. Because of these differences, it is difficult for a provider to judging initial applications for granting loans or providing insurance and to administer ongoing arrangements. Accordingly, it is desirable for financial institutions to receive current information about customers on an ongoing, near real time basis, and to receive the information in a standardized form. It is also desirable to provide an incentive for customers to provide up-to-date information in a standard format, because customers often benefit from the current conventional arrangements and might otherwise be unwilling to change. It is also desirable that the current information be processed in near real time and effects resulting from the processing be incorporated into financial arrangements in near real time.

Another problem occurs when a company uses its equity for non-core business purposes, the results of which are outside the power of company management, such as investments in securities or other companies. Outside investments decrease the transparency of the company to financial product providers and increase the risk of losses that management has no power to avoid, yet which can destroy the value created by the company's core business. It is desirable to enable a company to sell such outside investments, or hedge the risk associated with them, so that investors may assess the company based on its core risk undertakings.

Yet another problem for financing and insurance providers is that the current conventional methods of analyzing credit risk are very difficult to automate. Due to the lack of information, human judgment is essential in the process of asset or company financing. It is desirable to create the ability to manage credit objectively, which may enable full automation of all evaluation and maintenance processes.

Customers of financing and insurance providers, which are typically corporate entities, also experience problems associated with current conventional finance and insurance arrangements. One problem for companies seeking financing or insurance is that current conventional arrangements and structures consider providing sale support financing (i.e., accounts receivable) as an expense, while receiving sale support financing from suppliers is considered to be free. This is a negative incentive to doing business, as a seller experiences an expense when financed sales are made, yet a buyer experiences no expense for purchasing stock using debt. It is desirable to reverse this effect, as this will provide incentives for buyers to lower inventory, pay for stock quickly, and utilize customer financing more strategically when it is needed. It is also desirable for companies to lock in a profit at sale time for an accounts receivable sale, to reduce the hedging cost of the profit, and to bring forward part of the profit.

A related problem for companies seeking financing or insurance is that it is difficult to raise capital by selling sale support financing (accounts receivable) assets to investors because the risk absorption and funding provisions desired by investors have different characteristics than those offered directly by sale support financing assets. It is desirable to create instruments having investor-desired characteristics based on sale support financing assets.

Yet another problem for companies seeking financing or insurance is the inefficiency of current conventional risk ratings. Conventional risk ratings are based on a banker's or other subjective assessment that is minimally transparent, at best. Therefore, once a year when a new subjective judgment is made the borrower may be faced with downgrade surprises. It is desirable for a borrower to each day understand the change in assessment and to have the ability to remedy any negative trends as soon as they set in. To enable this the subjective element of finance and insurance provision must be removed to the largest extent possible. It is desirable to provide fully objective finance and insurance provision to borrowers, including reporting in near real time to borrowers their current rating.

Another problem for companies seeking financing or insurance using current conventional products is that it is not possible or desirable to share capital and funding sources between companies without an intermediary, such as a bank, because sharing would release each company's confidential pricing and business volume information to the other company. It is desirable to confidentially share capital, funding sources, facilities, hedges, security programs and data among communities of corporations without using a costly intermediary and without revealing confidential information. Pooling assets from various companies into a portfolio increases diversification, which decreases the capital required and increases the efficiency of execution due to size effects, which decreases the cost of funds to the companies.

Another problem for companies seeking financing or insurance using current conventional products is that a company does not have available to it money equal to the value of its equity in the market. It is desirable for companies to issue or repurchase equity shares on a daily basis without diluting shareholding to optimize capitalization at every point in time with respect to these portfolios. It is also desirable for companies to have access to subordinated funding anonymously on a daily basis, which releases equity for other purposes. It is desirable to create such anonymous, flexible equity.

Yet another problem for companies seeking financing or insurance is "credit squeeze." A fast-growing, successful company has financing needs that grow extremely quickly. Often, however, it cannot obtain the additional financing that it needs to grow and to service its previous financing because it reaches its financing limit. Thus, the company runs out of financing even though its current high-growth situation warrants additional financing. This situation often results in default on its earlier financing obligations. Accordingly, it is desirable to avoid credit squeeze by providing additional financing whenever assets are available to support the financing and by pricing the financing based on risk. It is desirable not to place limits on the amount of risk, but instead to appropriately price the risk that exists in near real time.

Yet another problem for companies seeking financing or insurance using current conventional products is that they cannot fully outsource the financing because minimum cost of funds cannot be guaranteed. It is desirable to provide a system in which financing can be completely outsourced, and a company can easily verify, control, and minimize the actual cost of funds, taking into account its other funding sources. It is also desirable to have near real time arbitrage of various sources of funds. It is desirable to provide objective assessment, which allows such verification and control.

Yet another problem for companies seeking financing or insurance is the difficulty of obtaining capital and funding in bad economic times and the excessive ease in good times, regardless of changes in the quality of the underlying value drivers in the company, such as the quality of ideas and persons and the ability to provide labor, among others. Companies are at the mercy of the large amount of systemic risk in the current financial system, exemplified by the economic or business cycle. The business cycle systemic risk is exasperated by losses and gains that do not quickly materialize and become known to the market due to the financial system, accounting rules, and the legal system. In addition, the market typically reacts to events, such as declared losses or declared reductions in profitability, with price swings more excessive than the events dictate. It is desirable to increase non-systemic volatility, i.e., allow individual companies to be more volatile, if doing so will decrease systemic volatility, i.e., make the economy less volatile. Near real time transparency and objectivity will help realize this goal.

Investors in securities and instruments based on financing and insurance arrangements also experience problems associated with the current conventional arrangements. One problem for investors is the inconsistency of risk management of the assets underlying such securities and the lack of transparency of the risk management process. Another investor problem is the lack of standardized value measurement for such securities.

Similar to the world of securitization, it is desirable to provide a common basis for assessing the risk and the return of transactions without the need to use subjective assumptions or analysis. In addition it is desirable to provide the ability to optimize and execute such transactions in near real time by making such transactions objective.

Similar to the world of mutual funds, it is desirable to enable asset investment whereby both the asset and liability providers have the ability to bid and sell or invest in near real time, removing the need for a fund manager and increasing the efficiency of determining the investment appetite and sale appetite of all parties involved.

SUMMARY OF THE INVENTION

Various aspects and embodiments of the present invention provide the desirable functions, characteristics, and the abilities that solve many of the problems associated with current conventional methods and systems for creating, transacting, and maintaining financial products such as loans, insurance, hedging products, and the like Systems, methods, and computer program products, consistent with the principles of the present invention, are provided for financing at least one pool of assets within a portfolio using at least one liability instrument, comprising: obtaining data on the assets in the pool of assets; learning the behavior of the assets based on the data obtained, wherein learning comprises estimating a cash flow distribution originating from each of the assets; creating a sell-option for the pool of assets; projecting future performance of the pool of assets based on the behavior learned; projecting future performance of the portfolio with and without the assets in the sell-option based on the behavior learned; determining a set of possible funding options for the sell option, wherein each possible funding options comprises at least one liability instrument; and presenting the set of possible funding options to a user.

In accordance with another aspect of the invention, systems, methods, and computer program products are provided for obtaining asset data, comprising: providing, to a user, an interface for inputting data and changes to the data; providing, to a user, an interface to identify the data and its status from among an official data set; freezing the data input by the user such that said changes can no longer be made by the user; confirming the information in the data input by the user using a physical check; and allowing the user to use a resource if the data input by the user is confirmed to be accurate.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate various embodiments of the invention and together with the description, serve to explain the principles of the invention. In the drawings.

DESCRIPTION OF THE EMBODIMENTS

Reference will now be made in detail to exemplary embodiments of the invention, examples of which are illustrated in the accompanying drawings. Wherever convenient, the same reference numbers will be used throughout the drawings to refer to the same or like parts.

Many of the embodiments described are concerned with sale support financing financial assets, such as trade receivables. However, as will be appreciated by those skilled in the art, the teachings of the invention are equally applicable to any type of asset, including other assets on the balance sheet.

Figure 1:
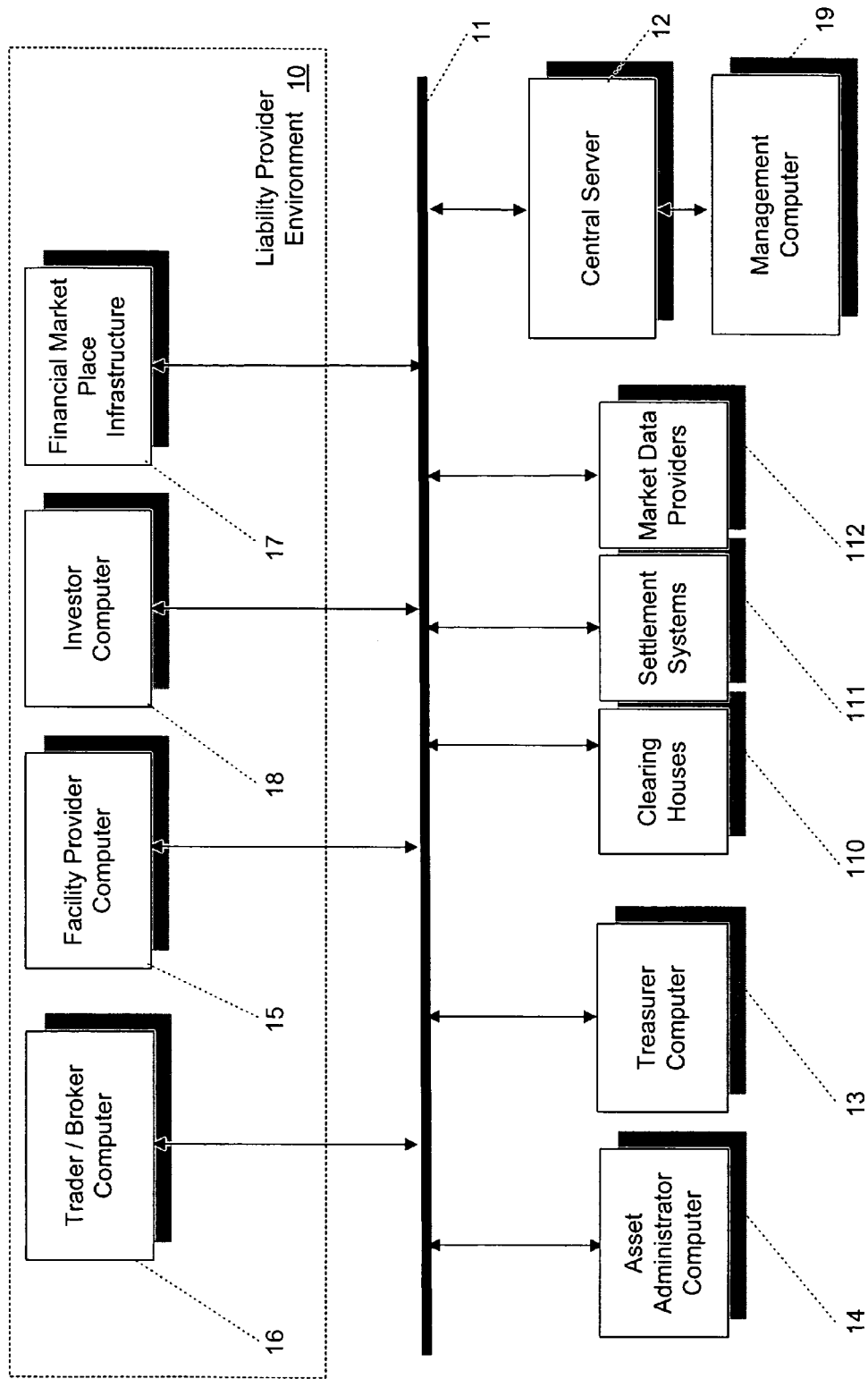
FIG. 1 illustrates an exemplary system and arrangement of users, consistent with the invention.

FIG. 1 illustrates an exemplary system and arrangement of users, consistent with an embodiment of the invention. As shown in FIG. 1, a network 11 (such as the Internet, private network, virtual private network (VPN), leased line, and/or other networks or combination of networks) connects a number of general-purpose computers in a secure way, as is well known in the art. The present invention relates in part to the programs, processes and methods stored in the memory (such as RAM, disk, ROM or other) and executed by the central server 12, which is used through browsers or automatic interfaces by various computers, users, and groups over the network 11. For purposes of illustration, the central server 12, together with its software, connections and all required to make it run adequately, is referred to herein as the Finance Infrastructure (FI).

Several entities may connect to the FI via the network 11. In the exemplary embodiment of FIG. 1, entities with assets, such as corporations, financial institutions (including banks), etc. are represented by the treasurer computer 13. Such entities may use the central server 12 to analyze, price, value, finance, insure, sell, and/or implement financial arrangements for assets, including pools of assets. Such an entity is often referred to herein as a "treasurer."

Treasurers may administer the assets themselves or may outsource the administration function to a third party who accesses the FI through asset administrator computer 14. Administration involves originating assets, including pricing assets, and managing assets, including risk management and providing asset data to the central server. Separate or multiple computers may be used for each function.

Facility provider computer 15 in FIG. 1 represents banks, financiers, investors and others that provide facilities (such as overdrafts, revolving loans, liquidity, derivatives and insurance) to the FI, for (partial) financing or insurance of assets and which may use such computer to analyze, price, bid, deal and track any financing provided and the assets underlying the financing.

Trader/broker computer 16 represents traders and brokers that perform brokerage, underwriting, and/or other services to increase the liquidity of financial instruments and securities issued by the FI and purchased by investors.

Financial marketplace infrastructure 17 represents marketplaces, including electronic marketplaces, where the securities and instruments are offered and purchased, such as Bloomberg and Reuters, which FI may use for distribution of facilities or investment products to investors.

Investor computer 18 represents holders of instruments and securities created according to the teachings of the invention, who can obtain tools from the central server 12, such as reports, to manage their investments. Computers 15-18 are jointly referred to as liability provider environment 10.

Management computer 19 represents a FI management organization that manages and services systems, methods, entities, assets, securities, and/or financial arrangements, consistent with embodiments of the invention. Among other things, management computer 19 performs treasury functions for entry and access provision to facility providers, including: servicing of signed contracts to gather data for, evaluate, access, and execute the variable terms and conditions relating to the contracts, instruments, and securities; operations functions for the execution and management of payments, issuance, and accounting; and/or research and development functions for the calibration and development testing of risk analysis procedures.

These management functions may be split-up and handled by various parties to provide management risk mitigation and segregation of duties.

Clearing houses 110 execute transactions and issue securities and other instruments (such as derivatives). Settlement systems 111 make payments to treasurers and facility providers, initiate direct debits, and receive payments. Further, the FI may connect through network 11 to a multitude of market data providers 112 that provide information used in the calculation of the risk associated with assets and to provide a basis for the identity or identification of assets. Market data includes, among other things, equity prices, balance sheet and P&L statements, bond prices, asset indices and prices, commodity prices, and option prices. Clearing houses 110, settlement systems 111 and market data providers 112 function conventionally, and their exact identity and configuration are not critical to embodiments of the invention.

Figure 2:
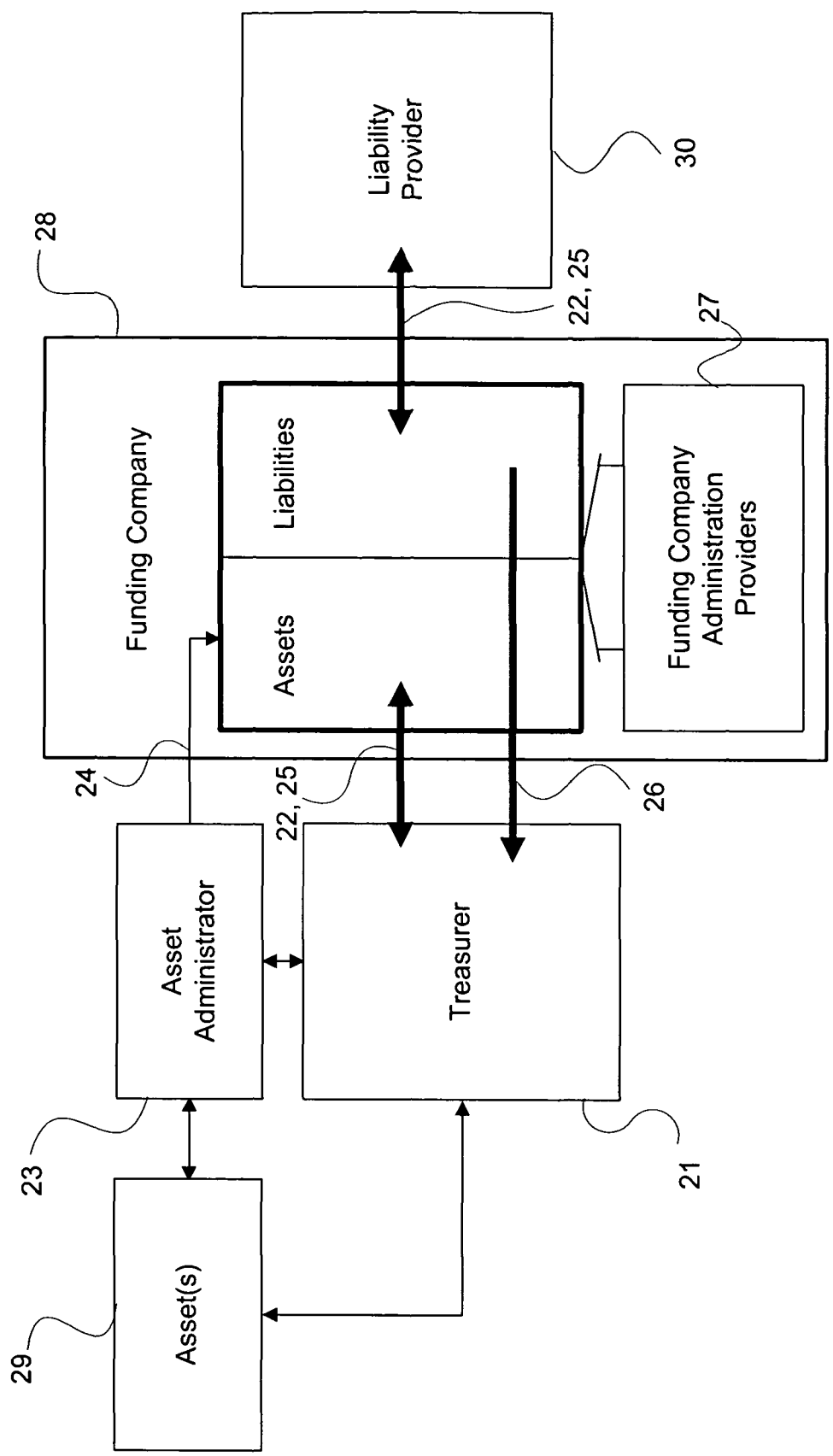
FIG. 2 is a block diagram representing exemplary transactions, balance sheet organization, and parties, consistent with the invention.

FIG. 2 is a block diagram representing exemplary transactions, balance sheet organization, and parties, consistent with the invention. As shown, a funding company 28 of the FI may provide a treasurer 21 with financing or risk protection for assets 29 held by treasurer 21. Treasurer 21 and funding company 28 may structure an arrangement 22 to transfer at least a claim on the assets to the funding company 28. The arrangement 22 may be structured in various ways, including as a sale of the assets, as a pledge of the assets, including a silent pledge, and as a derivative risk transfer agreement, among others. An asset administrator 23, which may be an outsourced party, but in most cases is the same legal entity or group entity as the treasurer 21, administers and services the assets according to an administration agreement 24 with the funding company for the transferred assets. The asset administrator 23 performs services associated with the assets, as needed, such as cash collections, selling of the assets, liquidation, legal proceedings and portfolio management among others.

The funding company 28 has liabilities, which may be off-balance-sheet liabilities, including investments 25 from liability providers 30 (facility providers or investors) or treasurers 26. In a preferred embodiment of the current invention, liabilities from treasurers and liability providers are treated equal. Liabilities 26 may include (but not necessarily), participation in the risk associated with all the assets underlying arrangement 22, which assets may come from multiple treasurers; with solely the assets originated by the treasurer under arrangements 22; with a subset of the assets of the treasurer, or of another treasurer; with a single asset; or with any other combination. The risk taken by liability 26 may be subordinated, senior, pari passu, or other risk structuring. One of ordinary skill will recognize that although the exemplary embodiment shown in FIG. 2 illustrates only a single treasurer 21, the principles of the invention apply equally to many treasurers or groups of treasurers and many investors and facility providers, as further elaborated in the context of FIG. 3.

Consistent with embodiments of the invention, funding company administration providers 27 administer the funding company 28 and its contracts and arrangements with outside entities. In one embodiment of the invention, funding company administration providers 27 may employ management computer 19. In one embodiment of the invention, the administration of the funding company may be performed by multiple entities, which provides segregation of duties.

In the exemplary embodiment shown in FIG. 2, treasurer 21 may provide purchased goods or services to a customer/debtor via sale support financing. In this example, the payment obligation resulting from the purchase is asset 29, which is a trade receivable asset. For a trade receivable asset, a debtor owes treasurer 21 payment for the goods or services on a specified date. Treasurer 21 may make an arrangement 22 to transfer the trade receivable asset or in a preferred embodiment a portfolio of trade receivable assets, which represents a future payment, to funding company 28 in exchange for a smaller immediate payment under arrangement 22. The payment liability under arrangement 22 to treasurer 21 may be arranged through one or multiple liability instruments each by one or multiple liability providers 30, which may include the treasurer 21 simultaneously.

To exemplify the concepts of FIG. 2, consider a simple embodiment with two liability instrument types being a subordinated loan financing up to 20% of the payment liability 22 provided by treasurer 21 to the funding company and a working capital facility provided by a single liability provider for the remaining 80%. On each transfer under arrangement 22, the subordinated loan may be used for 20% of the payment liability under 22 and 80% may be drawn under the working capital loan.

One of ordinary skill will recognize that the principles of the invention may be applied to other types of assets in addition to trade receivable assets. For example, embodiments of the invention can be applied to assets such as leases, credit cards, unsecured and secured loans (personal, corporate, etc.), rent, inventory, and mortgages, among others.

Figure 3:
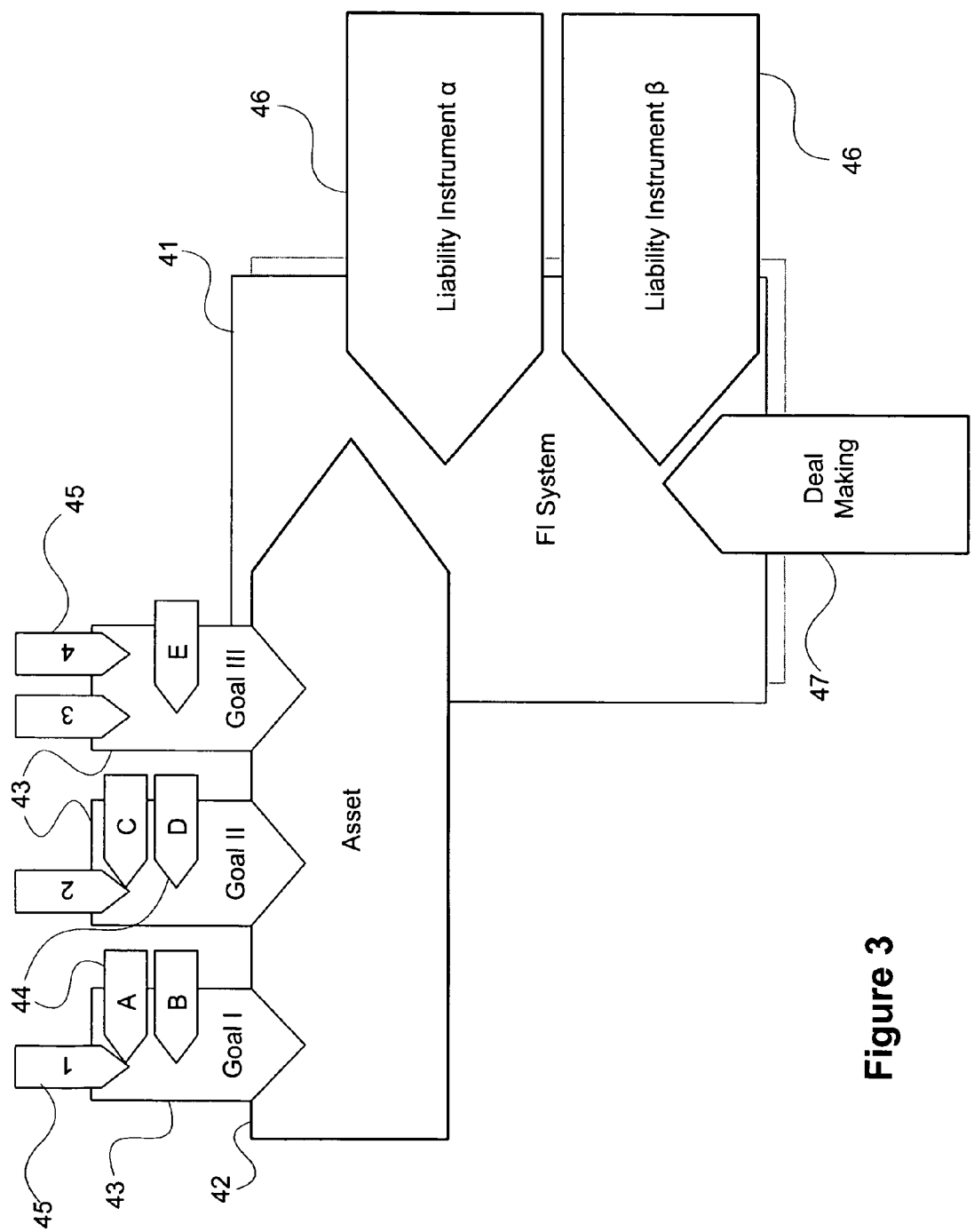
FIG. 3 is a block diagram representing an embodiment of an exemplary system with plug-ins, consistent with the invention.

FIG. 3 is a block diagram representing an embodiment of an exemplary system, consistent with the present invention. In the embodiment of FIG. 3, a FI system 41 is illustrated that includes plug-ins, which may be inserted into or combined with FI system 41. Such plug-ins may be implemented with software (as components, modules or applications) to provide the necessary functionality.

As shown, FI system 41 may be adapted with a plug and play aspect that allows the basic infrastructure engine support various plug-ins, such as asset types 42, liabilities 46, goals 43, procedures 44, testing procedures 45 and deal making plug-ins 47. In the embodiment of FIG. 3, FI system 41 includes one or more asset plug-ins, such as a trade receivables asset plug-in 42. Asset plug-ins may have zero or more goal plug-ins 43, such as the all-in financing cost (AFC), funding option or receivable AFC goal plug-ins 43. The goal plug-in 43 may have zero or more procedure plug-ins 44 (shown as procedures A-E) which may each calculate a goal, in a preferred embodiment in parallel, according to a priority. The goal plug-ins may have zero or more test procedure plug-ins 45 (shown as 1-4) which each provide a test of the adequacy of the goal models which may use back testing and benchmarking techniques and which may run in parallel.

Users of the FI may be provided the ability to select which plug-in they desire to use for each activity or deal, thereby providing flexibility to the users and trust in the adequacy of the plug-ins used. The fact that each plug-in always calculates across pools and portfolios using the same method supports making the FI objective.

FI system 41 also has one or more liability plug-ins 46, such as sub-loan and working capital plug-ins shown as $\alpha$ and $\beta$ in FIG. 3. FI system 41 also has one or more deal-making plug-ins 47. The plug and play method allows creation of multiple risk assessment and balance optimization methods in parallel, as embodied in various procedure plug-ins for goals. The plug-in methods are easily benchmarked in a short timeframe using the test plug-ins 45, creating participant trust in the adequacy of the procedure plug-ins 44. Furthermore, the plug-in design makes improvements to the procedures, algorithms, and models embodied in the plug-ins, as well as new plug-ins, easily available to all user of the FI system. Furthermore, the plug-in makes sure that when improvements are contemplated to procedures, these are made in new procedures, ensuring objective and appropriate ability to test whether the new procedure indeed exceeds the quality of other procedures.

To exemplify the concepts related to FIG. 3, consider a simple embodiment in which goal plug-in 43 is a default probability of a debtor within a year. Procedures 44 may be implemented using conventional procedures or methods, such as the Merton method and the Altman Method. Further, test plug-in 45 may be implemented using tests or methodologies well known in the art for analyzing the probability of default goal, such as the gini score. In a preferred embodiment, the FI system calculates the default probability for each debtor available for the entire history of data available and each time new data is received impacting the calculation, the system may use exactly the same algorithm for each calculation. Next, the gini score may be calculated using the default history in the data for both procedures. In case a parameter within one of the algorithms is changed, an additional procedure may be added.

Figure 4:
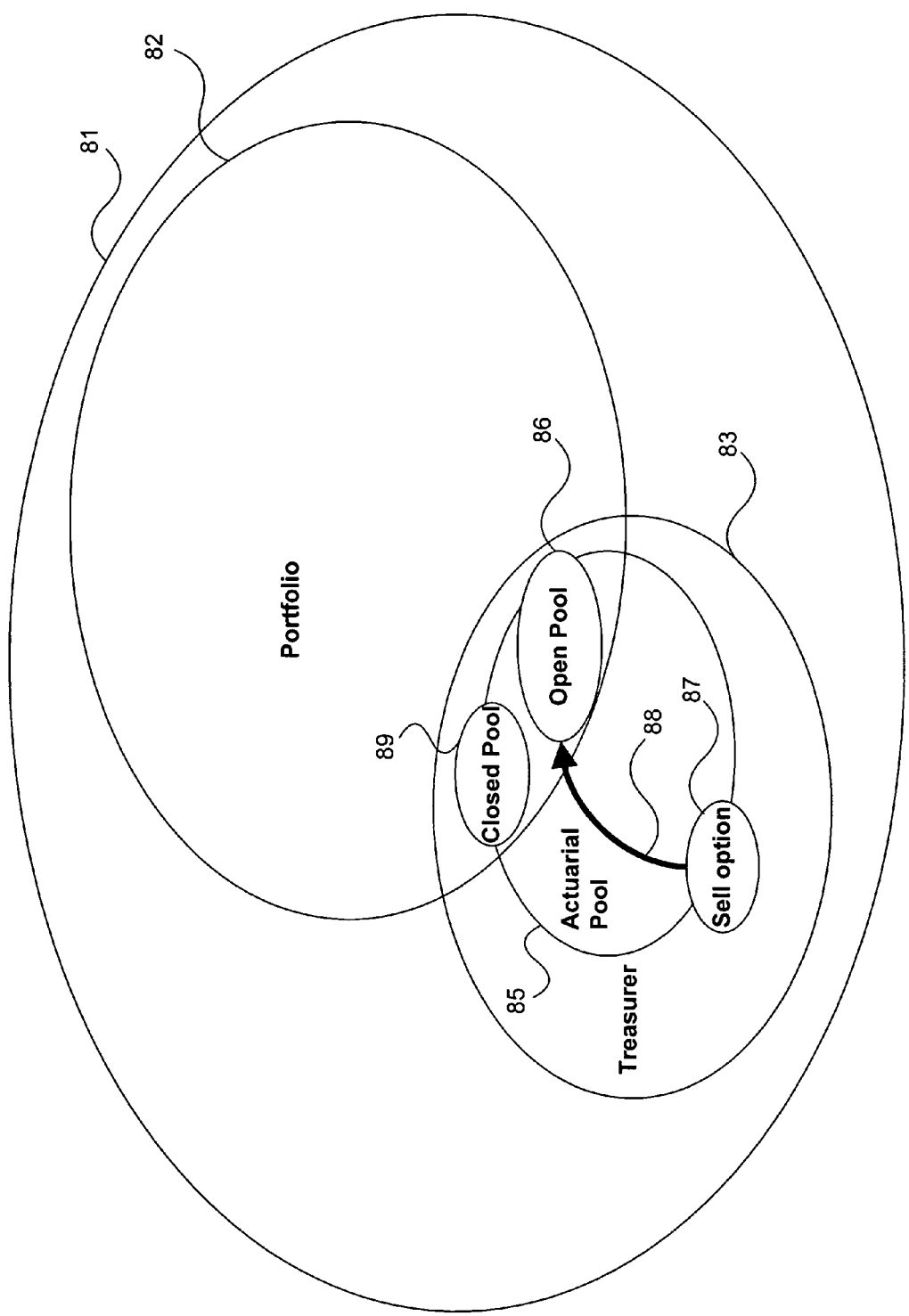
FIG. 4 illustrates an exemplary pool management design, consistent with the invention.

FIG. 4 shows an exemplary division of assets into portfolios and pools, consistent with the current invention. Such division may come into existence after a period of use of embodiments of the invention.

Total asset set 81 represents the total universe of assets now, in the past and in the future. A financed and insured portfolio 82 within the FI system comprises of a subset of the total asset set 81, such as a portfolio of trade receivables, and other assets, which are represented by everything inside oval 81 that is outside of oval 82, which may or may not be financed through other FI system portfolios. The asset set 83 represents the assets originated or held by a the treasurer. In one preferred embodiment, a treasurer may have access only to the assets that the treasurer originated. Treasurer assets 83 represent the assets of a single company or a group of companies, which may be affiliated. A treasurer asset 83 may include assets financed by an FI portfolio 82 represented as the overlap between 83 and 82, but may also have assets financed in multiple portfolios. In one preferred embodiment consistent with the invention, liability instrument provider may see the risk profile of the FI portfolio of assets 82, but cannot see the risk or profile or assets of other portfolios.

Sell options 87 represents a set of assets the treasurer contemplates financing in the context of a pool 86, which is financed in a portfolio 82. When a deal 88 is made, the assets in the sell option move into the open pool 86, increasing the size of open pool 86 and FI portfolio 82.

Further references in FIG. 4 (such as the closed pool 89) are explained in context of the treasurer language step below.

Figure 5:
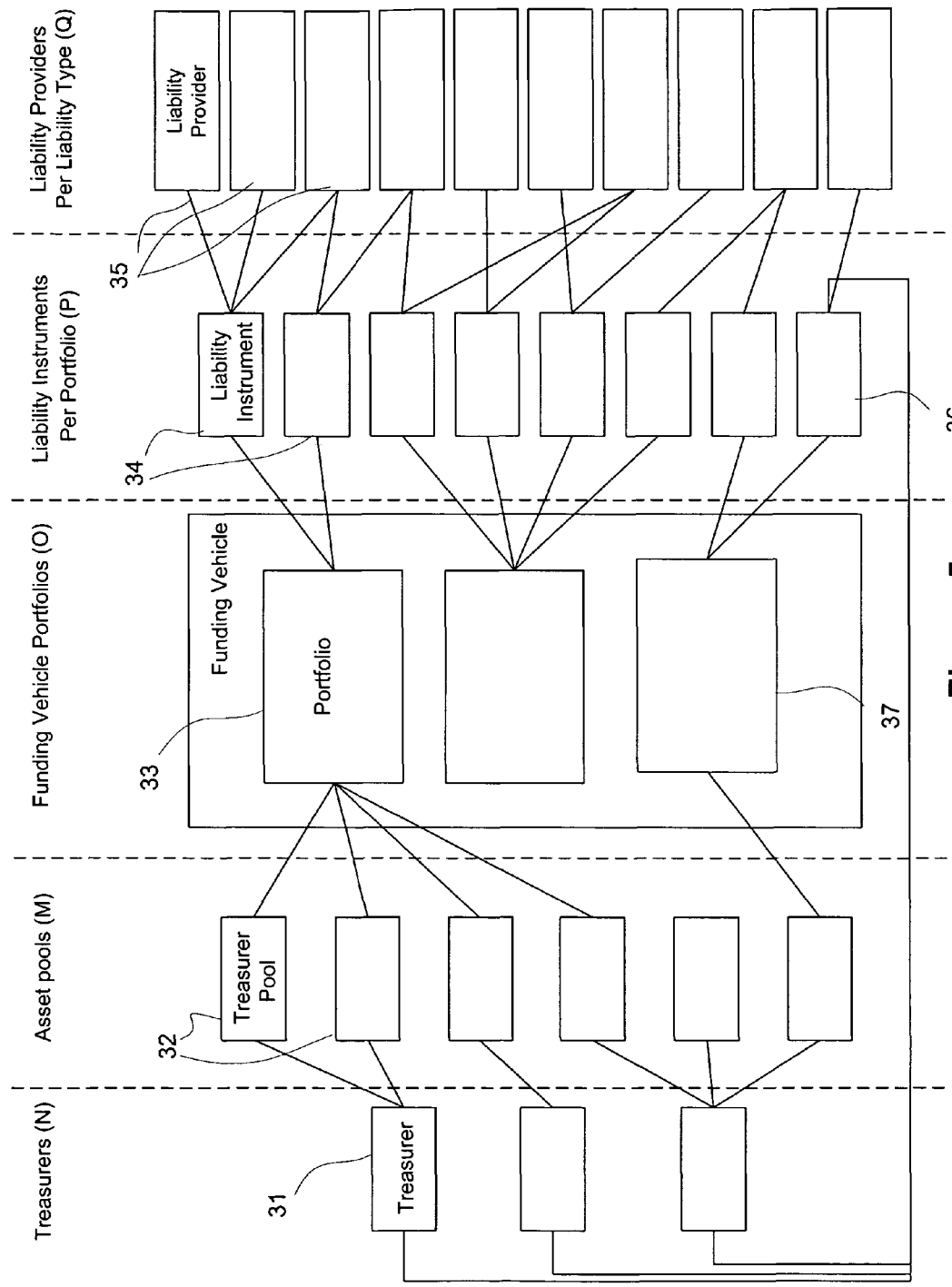
FIG. 5 illustrates a relationship between treasurers and liability providers, consistent with the invention.

FIG. 5 shows exemplary relations between treasurers, asset pools, funding vehicle portfolios, liability instruments and investors or facility providers, consistent with the invention. One or many (N) treasurers 31 may each create one or many pools of assets 32 (M), each pool of assets 32 may be funded and/or insured in a portfolio, as described above in context of the embodiment of FIG. 4. There may be multiple portfolios 33 (O) in each funding company 28. Each portfolio 33 may be funded by one or many liability instruments 34 (P). Each liability instrument 34 for each portfolio may have multiple liability providers 35 (Q) and or treasurers providing the liability instrument(s) 34.

For example, a treasurer 31 may have two pools of assets 32 which are funded within one portfolio 33. The portfolio may be funded by two liability instruments 34. The first liability instrument 34 may be provided by three liability providers 35. The treasurer 31 may also provide a liability 36 to another portfolio 37. The other relationships shown in FIG. 5 provide other examples.

Figure 6:
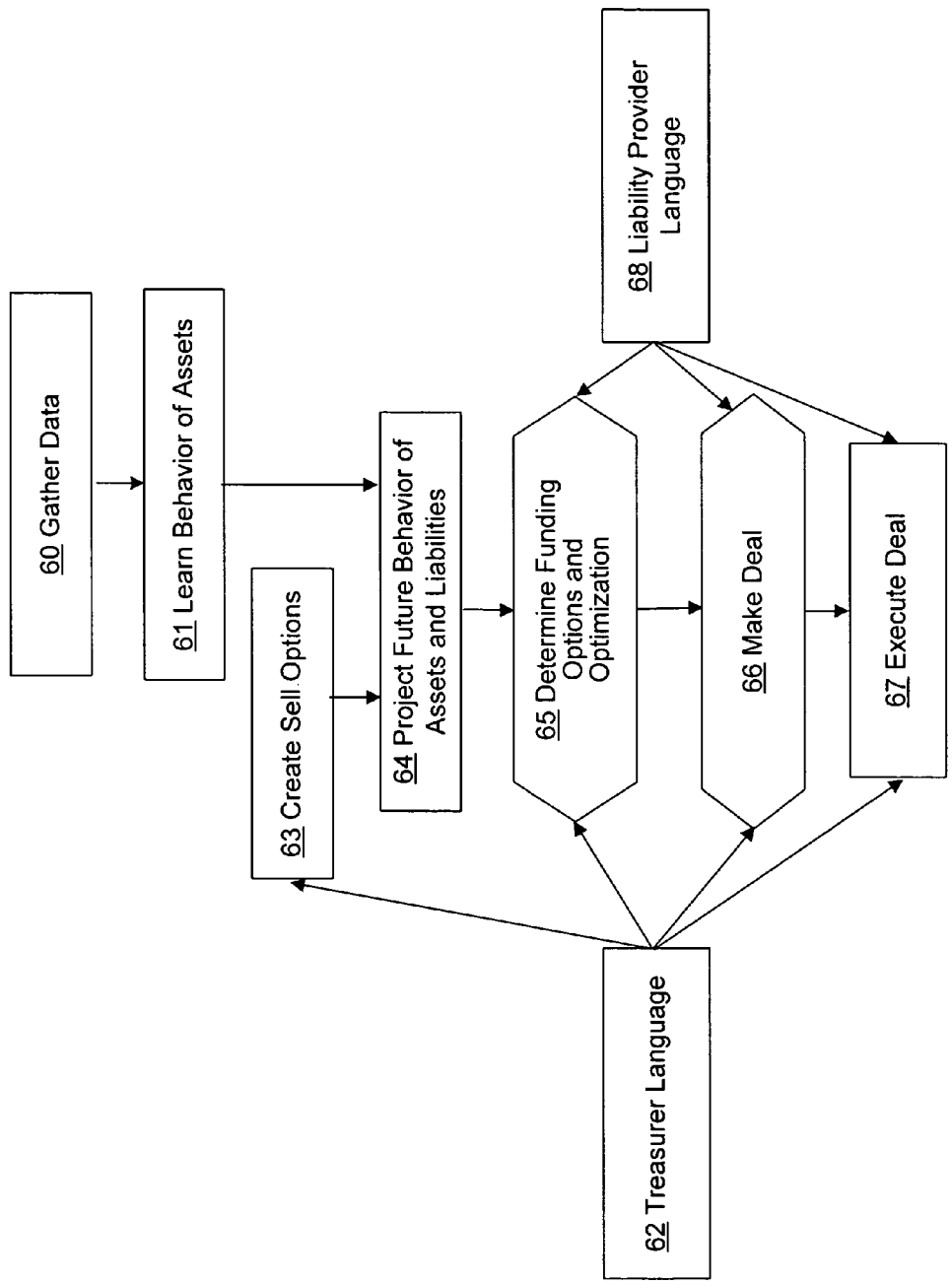
FIG. 6 Illustrates an embodiment of an exemplary process executed by a data processing system, consistent with the invention.

FIG. 6 illustrates an embodiment of an exemplary process, consistent with the invention. The exemplary embodiment of FIG. 6 may be implemented within the FI system of FIG. 1, in particular, by central server 12 and management computer 19. More details that may be part of the process steps in FIG. 4 are presented hereinafter.

As shown in FIG. 6, the system first gathers relevant data regarding the asset being financed or contemplated to be financed and regarding the liabilities used or that may be used to finance the assets (step 60). In one embodiment, this data may be gathered by central server 12 from the computers connected to the network 11 (see FIG. 1). The connected computers may provide this data each time it changes, or the data may be gathered in batches periodically, or the data may be gathered according to some other scheme that minimizes the response time to relevant changes in the data. The gathered data includes data regarding the historical performance of the assets, expected events regarding the asset, future contractual events for the asset, and/or the liability parameters for the asset, among others.

Figure 7:
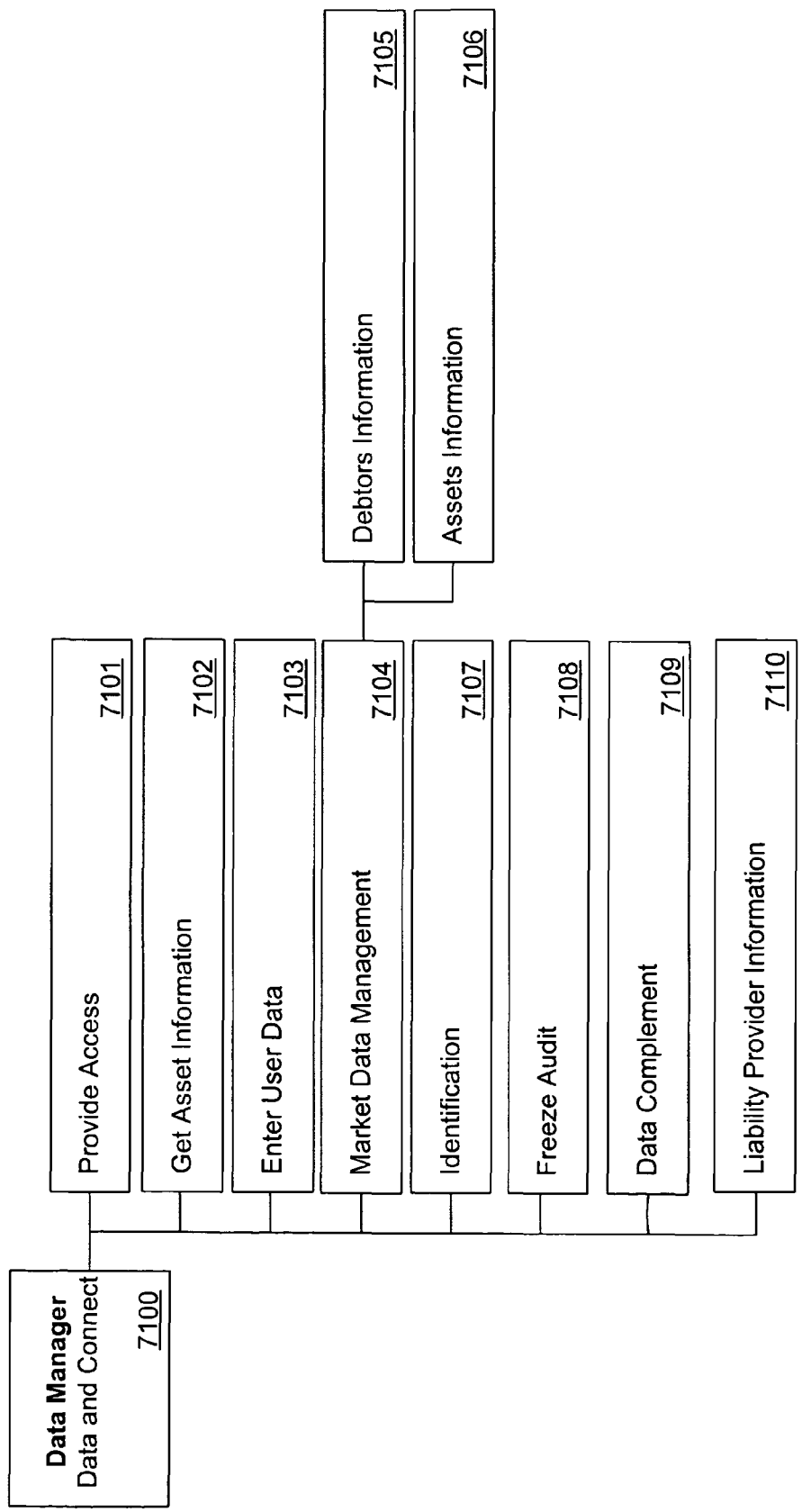
FIGS. 7 and 9-13 are exemplary hierarchy charts for implementing a system, consistent with the invention.

In one embodiment, the data gathering step 60 is implemented with a data manager, such as that described in the exemplary embodiment of FIG. 7. To obtain asset data, such a data manager may provide a user interface for inputting data and changes to the data. An interface may also be provided to enable a user to identify the data and its status from among an official data set. The data manager may also freeze the data input by the user such that changes can no longer be made by the user, confirm the information in the data input by the user using a physical check, and allow the user to use a resource if the data input by the user is confirmed to be accurate.

As shown in FIG. 6, the system may also learn the behavior of the assets based on the gathered data (step 61). As will be appreciated by those skilled in the art, various techniques and models may be employed to determine the behavior of the assets. Examples of approaches and methodologies that may be used for this purpose as further described below with reference to the features of central server 12.

Using the assets available, the treasurer 21 may a create sets of assets that are contemplated being financed, referred to as sell options 87 (step 63). The treasurer may do this using the treasurer computer 13 in treasurer language 62.

Based on the behavior learned, the FI next makes projections regarding the future behavior of an open pool 86, an open pool 86 that includes a sell option 87, a portfolio 82, an asset portfolio 83 with a sell option 87, and/or for existing liability instruments on the portfolios (step 64). The projection step in a preferred embodiment may be implemented as a procedure 44, and multiple procedures 44 may be run in parallel (see FIG. 3).

The projections created in step 64 may then be used by the central server 12 to determine possible liability instrument combinations 46 (see FIG. 3), which may be used to finance the sell option, or which are required in context of the portfolio and its current liability instruments to finance the sell option assets in the portfolio. Each possible liability instrument combination is referred to as a funding option. The all in finance cost (AFC) of each funding option may be calculated as the sum of all costs of all the liability instruments comprising the funding option. Finding the optimal funding option comprises, for example, determining what funding option has the lowest AFC, which determination may consider the committed pricing of liability instruments, the latest execution of the specific liability instrument price or the pricing on a comparable instrument or index or any other extrapolation or benchmarking methodology (step 65).

Figure 11:
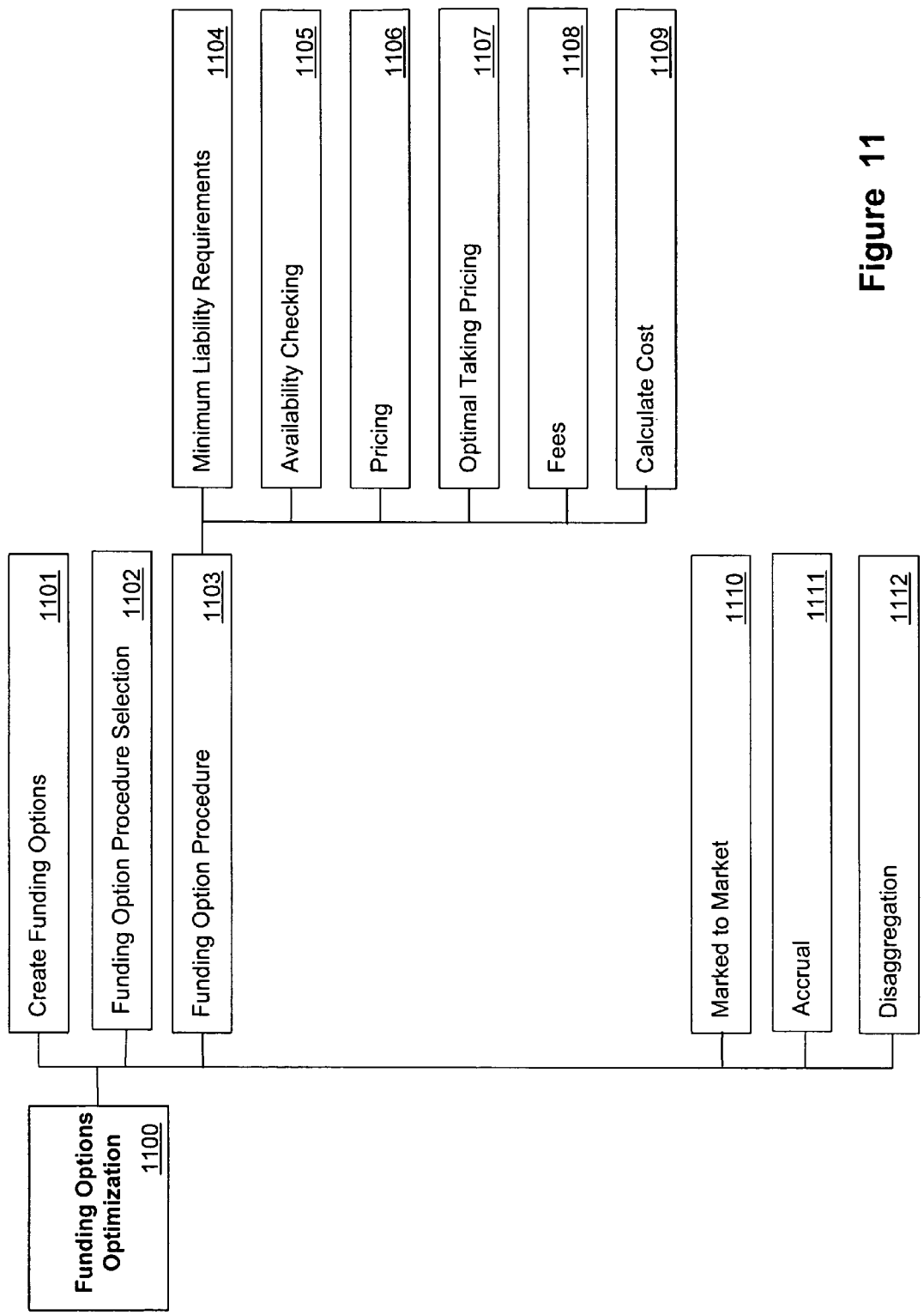

In one embodiment, the step of determining funding options and optimization (step 65) is performed using an funding options and optimization component, such as that disclosed in the exemplary embodiment of FIG. 11.

Based on the optimized new liability instruments, systems consistent with the invention may facilitate a deal between funding company 28 and multiple liability providers 30, each providing one or multiple liability instruments (step 66). A make deal component, such as that disclosed in the exemplary embodiment of FIG. 12, may be used for this purpose. Furthermore, systems consistent with the invention may provide components to optimize finding a funding option of which all liability instruments comprising the funding option and the sell option are committed at the pricing whereby the AFC of the sale is equal or lower than the AFC desired by the treasurer, referred to as a deal. The FI system may use the liability provider computers 10 and the treasurer computer 13 to foster communication and negotiation of such deals. Each deal may include a single or multitude of offers from treasurers, a single or multitude of liability instruments, and/or a single or multitude of liability providers per liability type. The deal may be negotiated in various ways either in person, using various communication means or an electronic trading system as so provided by the FI system or the electronic financial market place 17.

After a deal has been made, the system may facilitate the cash payments, transfer or pledging of assets, and/or other arrangements under arrangement 22, issuing or drawing or other of liability instruments that make up the deal (step 67). This step may be largely done using conventional payment, execution, and/or issuance systems such as clearing houses 110 and settlement systems 111, and legal service providers, as is well known in the art. Consistent with another embodiment, the central server 12 may also monitor the performance of the assets 29, calculate payments to be made under the arrangements 22 and the liability instruments 26, and/or create related payment instructions. An exemplary embodiment of a deal execution component is provided below with reference to FIG. 13.

Consistent with one embodiment, the system may facilitate the treasurer by presenting or speaking the preferred language of the portfolios of assets, which allows the portfolio to be valued at a single price (referred to as all in finance cost or AFC), although its financing may comprise a multitude of liability instruments each provided by a multitude of liability instrument providers all at potentially different prices (item 62). In this way, the treasurer may efficiently and easily evaluate different sell and funding options (as further elaborated on in the remainder) also in comparison to other funding sources the treasurer may be able to access. In case the treasurer changes the AFC, a multitude of possibilities to close the deal may appear, without the treasurer needing to negotiate them individually.

Consistent with another embodiment, the system may also facilitate the liability providers by evaluating their holdings in their preferred language through their preferred standardized channels, such as brokers or online brokerage accounts, or through a channel provided by the FI system (item 68). In this way, the liability providers can easily compare the investment opportunities with alternative comparable investment opportunities they may have, easing decision-making.

Exemplary embodiments of components for facilitating activities and information in the treasurer language and the liability provider language are provided below with reference to FIGS. 9 and 10, respectively.

One of ordinary skill will recognize that the exemplary process of FIG. 6 may be implemented with any number or combination of the steps added, removed, or modified without departing from the principles of the invention. For examples, steps 61, 64, and 65 could be combined into a single step having similar functionality or may be split in further steps.

To further exemplify the process of FIG. 6, consider a situation involving a subloan and a working capital loan. The treasurer may offer or commit a sell option at a maximum AFC of say 1000 and simultaneously commit to a subloan for 20% of the pool at 600 interest. Possible funding options in this case are those where the working capital loan wants to forward 80%, at a maximum interest of 400. Using the results of the procedures, the working capital provider may assess whether to provide such funding at such interest. Once a working capital loan has been found, committed at such maximum pricing, the deal is executed.

To further exemplify the process of FIG. 6 using a more complex situation, consider the possibility of a subordinated loan, a mezzanine working capital loan and a senior working capital loan. Assume again the same commitment by the treasurer to the sell option and the subordinated loan. Possible funding options are now all combination of mezzanine and senior loans together providing 80% at an aggregated interest of 400 or less. Lets now assume that the senior provider commits to 70% at 300 interest, the mezzanine provider may be presented the funding option to forward 10% at 100 as a funding option which may lead to a deal, the treasurer may be presented to increase his commitment to 30% at 100 to close the deal and the senior provider may be presented to up by 10% at 100 to close the deal. In case the mezzanine provider now commits to 5% at 50, the funding option deal possibilities to the other providers may be updated. Let us now assume a second mezzanine provider appears. The new mezzanine provider will also be presented the option to invest 5% at 50 to close the deal. Again each user may use the results of the procedures including the cash flow distributions and testing results to evaluate interest in such investment.

As will be appreciated by those skilled in the art, the concepts and process of FIG. 6 may be readily applied to more complex environments, with addition liability instrument types and across multiple sell options.

FIG. 7 shows a Data Manager component 7100 that may implement the gather data step 60 that gathers, complements, identifies, and/or controls the information and data needed to create a financial arrangement, consistent with the invention. The Data and Connect component 7100 may be adapted to gather timely, high-quality information. In one embodiment consistent with the invention, monetary incentives, such as price incentives, are provided to treasurers and debtors to encourage them to provide high quality data in a timely manner. In one embodiment consistent with the invention, a data availability problem does not abort the execution of a transaction based on the remainder of the data, and when the data availability problem is fixed, for example through newly supplied data or through a manual procedure, the asset associated with the data can then be used in a financial arrangement or more efficiently financed or insured.

Data Manager 7100 may include a number of subcomponents. For example, a Provide Access subcomponent 7101 of the Data Manager 7100 may provide access to the FI system, securely verifying the user's identity and confirming that the user's access rights are current. In one embodiment consistent with the invention, the Provide Access subcomponent 7101 allows user access via a conventional public key infrastructure or other conventional authentication standard, over a secure connection such as secure socket layer (SSL) or virtual private network (VPN).

The Get Asset information subcomponent 7102 provides an interface between the FI system and the asset administrator computer 14, and/or a ledger/accounting and/or enterprise resource management system(s) of the treasurer 21/administrators 23 of the assets underlying the desired financial arrangement. The interface may be implemented in various conventional ways known in the art, such as a download/upload mechanism or a real-time XML, SOAP, SWIFT or EDI application. In one embodiment, the FI system performs status management to check for consistency of status across all deliveries of data. Statuses may include open, paid, defaults, etc. The Get Asset Information subcomponent 7102 checks the adequacy, consistency, completeness, and/or integrity of the asset data. Failures and warnings may be provided to the user identifying any failures (e.g., missing or incorrect mandatory data), warnings (e.g., missing or incorrect optional data that enhances analysis) detected for gathered or input data, or inconsistent status updates of assets, and the opportunity costs (explained further below) of the failures and warnings. The user may correct information by updating the information in its own ledger/accounting and/or enterprise resource management system(s), and the next data transfer will obtain the corrected data, resolving the failure or warning.

The Enter User Data subcomponent 7103 allows users to enter information, either manually or automatically using an application program. Such information may be used to execute deals and assess risk. This information may include, for example, company accounts, bank accounts, historic performance data for the user, an asset's performance history, terms and conditions of invoices, ratings of the company and/or the standard process as used by the user in managing accounts. The information may also include automatic or manual identification data, with standard datasets of objects for companies, indices, country identifiers, etc. Certain information may be mandatory depending on the financial instruments, financial arrangements, and assets involved. In one embodiment, the system performs consistency checking to ensure the correct data is input and includes "help" or "wizard" components to assist users in entering the appropriate data. Another embodiment allows treasurers to signup online for system services and use of the FI system. In such a case, the system can invoice or direct debit subscription fees for these services. The Enter User Data subcomponent 7102 also allows users to enter non-deal specific information, such as changes to the structure of the treasurer environment, e.g., a new subsidiary added to a company, new annual accounts, and changes to other aspects of the data.

The Market Data Management subcomponent 7104 gathers market data required for identification and calculation of information used to structure a financial arrangement. The data required for identification is further referred to as the official data set. For example, for assets such as financial leases or trade receivables, Debtor Information subcomponent 7105 obtains complementary information regarding the debtors for the assets, such as information regarding the debtor's equity price, balance sheet, payment behavior, etc. For the assets themselves, the Assets Information subcomponent 7106 gets information about the physical asset underlying the financial asset, such as information on car valuation in the case of a leases or commodity prices.

The Identification subcomponent 7107 identifies the data entered by the asset administrator with market data gathered by the FI system. For example, in the case of a sale support financing asset, the system checks the entered debtor dataset against data obtained via computer download from, for example, the appropriate Chamber of Commerce, such as annual sales numbers, names, addresses etc. This results in a link between a treasurer's identification of the debtor and an official identification of the debtor used by the FI system for all the FI system users. As a specific example of identification and complementation for trade receivables, consider the case where the data received from the treasurer is "1000 EUR from Shell." The FI first identifies Shell as the "Royal Dutch Petroleum N.V." as Shell is officially known within the FI. Next the FI complements the data with the fact that Shell is in the oil industry and with its annual accounts used for assessing the risk of the asset. This link can be used to complement the treasurer's data with market data from public sources, and the data used as factors in the risk assessment. This link allows aggregating asset positions across administrators and treasurers or groups of treasurers, but also within treasurers (multiple entries for the same debtor). Understanding the complete position regarding an asset allows management and measurement of this risk in a single step. If automatic identification is not possible, the user can make manual identification. A user may prefer to use manual identification for large and high-risk asset exposures. In one embodiment, the FI system may provide a list with a number of closely matching asset identifications from the official FI system list. In addition, methods may be provided to effectively search through the asset database. In addition, to provide an incentive for treasurers and others to provide up-to-date information, non-mapped high-risk items may be treated as non-fundable until they are identified. In one embodiment consistent with the invention, only the largest assets need to be identified and the source of the assets, typically a treasurer, is responsible for identifying them. Furthermore the FI system data can be used as the source of identification codes used in the treasurers and administrators systems, which simplifies and makes more exact the identification in the FI.

In one embodiment consistent with the invention, the Data Manager 7100 includes a Freeze Audit subcomponent 7108 that confirms the quality and adequacy of the entered data and information. The Freeze Audit subcomponent 7108 disables the ability to edit provided data and initiates a physical audit process by an independent auditor based on a random audit scope, over-sampling suspect information, including that generated from the data entered by the user either through Get Asset Information subcomponent 7102, Enter User Data 7103, Identification subcomponent 7107, or other source. After a positive audit result, the user can start using the FI system for financial products. The freeze function does not, in a preferred embodiment, prevent the user from adding further changes to the data, although these may be retained separately by the FI system.

Subsequently, the Freeze Audit subcomponent 7108 may be repeated to confirm the adequacy of the additional data added and edited by the users. In one embodiment, the FI system periodically (based, for example, on the level of risk of the treasurer, the extent of the information changes made by the user, on time, suspect changes of data, and/or changes to data which differ substantial from the official data set), will trigger a new freeze audit sequence. If the treasurer does not satisfy the freeze audit in a timely fashion, the treasurer is suspended from using the FI system to obtain funding, insurance, or other financial products and current financing may be run down.

Freezing and auditing allows users to sign up for FI system services online without the need for an intermediary, forces users to provide data in a standardized format, and provides the security and data integrity required for later market transactions, including securities issuance in the capital markets.

Freeze Audit subcomponent 7108 furthermore allows the real time updates of data without compromising its controllability. Freeze Audit subcomponent 7108 improves data accuracy for generating near real time accounts and risk measures, as it strongly provides an incentive to treasurers not to enter suspect data as this may trigger a freeze and physical audit immediately.

One skilled in the art will easily understand that the freeze audit process may be applied more broadly than in the context of the FI embodiment. It may also be of value in the context of company balance sheet and profit and loss accounting to allow real time accounting, or accounting when required.

The Data Complement subcomponent 7109 adds additional data to a user-entered data set to create a more complete and higher-quality data set. The complementing information may be obtained from Market Data Management subcomponent 7104 and may be linked together based on the identification created in the identification component described above.

Liability Provider Information subcomponent 7110 allows liability provider 30 data to be entered to, amongst other things, assess the (non payment) risk of these parties. In one embodiment, the FI system may reject trades, or set limits with investors who do not provide satisfactory data or who lack a sufficient credit quality. In another embodiment the FI system may request a risk premium for such increased risk. The facility provider information may be subject to a freeze audit procedure like subcomponent 7108 to confirm the quality of the data entered by the user.

Referring again to FIG. 6, the central server 12 may perform the Learn step 61 using all data gathered, including historic data, market data provided by market data providers 112, and all treasurer provided data, all of which may be upgraded in quality using the data manager and identified across treasurers. Depending on the asset type and other sources of risk in the funding company 28, factors considered in the learning process may include, but are not limited to: time, season, day of week, interest rates, foreign exchange rates, economic indices, debtor credit indicators, debtor payment behavior, debtor equity prices, debtor future liquidity position, administrator behavior and indices, treasurer behavior, country and industry information, invoice size, maturity, underlying product, and dilution rates. In a preferred embodiment, these factors may drive the shape and form of a projected cash flow distribution of each asset.

Figure 8:
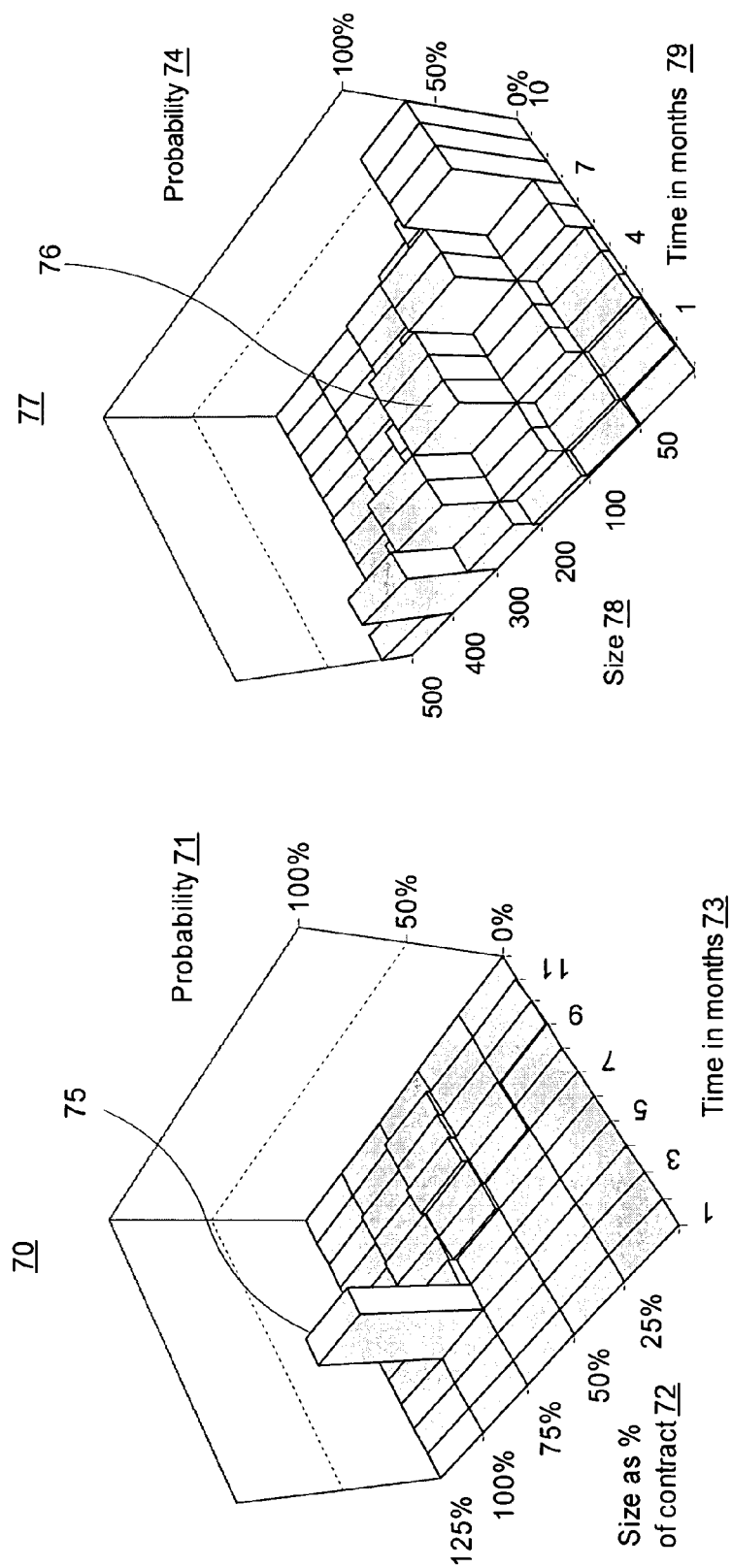
FIG. 8 shows examples of a cash flow distribution for a single cash flow instrument such as a trade receivable.

FIG. 8 shows an example of a cash flow distribution for a single cash flow instrument, such as a trade receivable. As illustrated by the three dimensional graph 70, the cash flow distribution may be represented as a probability 71 that a payment of a specified size 72 will be made at a specified time in the future 73 for a contract or invoice, which in this case is a single cash flow instrument. For the example shown by graph 70, there is almost a 60% probability that 100% of the payment due for the single cash flow instrument will be paid after three but before four months have elapsed 75. One skilled in the art will appreciate that a cash flow distribution may also be expressed in absolute amounts of cash and that time may be expressed in any convenient increment.

The Learn step 61 may include finding or mining information from the data in the central server 12, in one preferred embodiment, using various procedures 44 in parallel, such as a neural network. Other embodiments of step 61 may use statistical or generic algorithm techniques or other data mining techniques known in the art.

Embodiments of the invention may include components to estimate cash flow distributions for sets of assets and to treat such groups as a single asset to reduce calculation intensity. These sets will, in one embodiment, be smaller assets with similar behavior.

Using another procedure 44 for a goal 43, FI system 41 may aggregate cash flow distribution to calculate a projected cash flow distribution for a portfolio or pool or any set of assets (step 64). In one embodiment, the procedure may sum the absolute cash flow distribution of the assets in the set to obtain the cash flow distribution of the set. A cash flow distribution of such a set of assets may comprise a matrix of time, cash flow size and probability for the set of assets. As illustrated by the three dimensional graph 77 in FIG. 8, the cash flow distribution for an entire set of assets may be represented as a probability 74 that a payment of a specified size will be made at a specified time in the future. In a preferred embodiment, correlation between cash flow distributions is taken into account.

In addition to the asset cash flow, step 64 may include projecting the liability cash flow for portfolios with existing liability instruments or for new liabilities in a funding option. In a preferred embodiment, the relation between the asset and liability cash flow is taken into account.

Figure 9:
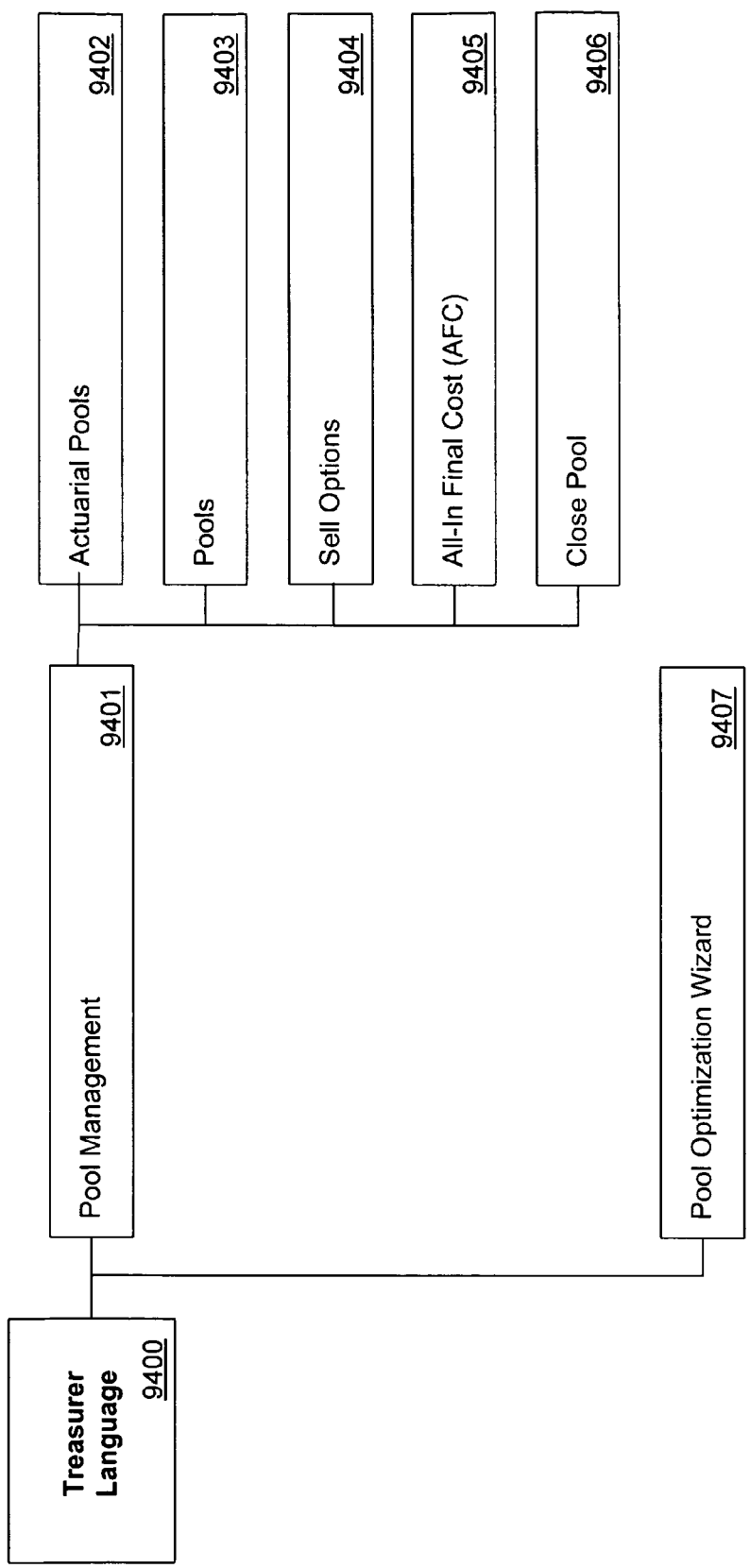

FIG. 9 is a hierarchy chart representing an exemplary Treasurer Language component 9400 and its associated subcomponents, consistent with an embodiment of the invention. The Treasurer Language component 9400 may provide one or more interfaces designed for treasurers to finance or insure assets, including pools of assets, and minimize the total associated cost of financing by finding the optimal sell options and funding options combination. In one embodiment, the Treasurer Language component 9400 has different user interfaces for different asset types.

Referring now to both FIG. 9 and FIG. 4, an Actuarial Pools subcomponent 9402 allows a treasurer to define an actuarial pool 85. Actuarial pool 85 may be defined by a set of non-time-related rules for grouping assets. In one embodiment, assets in an Actuarial Pool 85 are grouped based on rules for asset characteristic, down to the individual asset basis. For example, trade receivable assets may be grouped based on their maturity, debtor properties like industry or country, product, or legal entity selling, among other things. They may also be grouped by a procedure 44 result, such as probability of default.

In one embodiment, a treasurer can select to finance all new receivables between a start and an end date in an actuarial pool. In this embodiment, the pool will be a subset of the actuarial pool and of the portfolio. Before the end date, the pool is referred to as an open pool 86, and after the end date, or when the pool has been closed through the close pool subcomponent 9406, the pool is referred to as a closed pool 88.

A Pools subcomponent 9403 allows treasurers to create pools that are more general than actuarial pools. Such a pool may contain an individually selected set of assets.

A Sell Options subcomponent 9404 supports a sell option 87 (see FIG. 4), which refers to a set of assets that a treasurer is contemplating selling into a pool. The sell option 87 can include assets purely from a single actuarial pool 85 that are selected as the assets originated into the actuarial pool within a period. Alternatively, a sell option 87 may cross more than one actuarial pool, which allows a treasurer to benefit from diversification and other optimizations. Once the sell option 87 has been funded through execution of a funding option 88 (as described below), the assets in the sell option 87 move into the open pool 86 financed in a portfolio 82.

An All-In Final Cost (AFC) subcomponent 9405 may also be provided to generate, among other things, a report showing the AFC goal for a sell option 87 to assist a treasurer in selecting the optimal sell and funding option combination (further described below). AFC may be defined as the total cost (i.e., the sum of the cost of all liabilities and other costs) to finance the sell option 87 within the pool 86. A treasurer may strive to minimize the AFC when searching for financing and/or insurance for a pool 86.

A Close Pool subcomponent 9406 supports a closed pool 89 (see FIG. 4), which is a pool in which no further assets can be financed. In one embodiment consistent with the invention, a treasurer may close a pool 89 or the FI system may close the pool 89 based on predefined rules. Closing a pool may in one embodiment fix the liabilities instruments associated with the pool, allowing allocation of the losses realized in the pool among the liability instruments.

As further shown in FIG. 9, a Pool Optimization Wizard subcomponent 9407 may be included that provides one or more wizards and/or numeric optimizers to find the most effective pool composition and sell and funding option (as described below) compositions for a treasurer in the context of current liability availability (liquidity) and current market pricing. For trade receivables, for example, the AFC subcomponent 9405 may provide a report or other output showing per driver of correlation, where the concentration level of the portfolio of all treasurers is concentrated, compared to the market. Where the concentration level is low, the treasurer will be able to insure receivables cheaper. As another example for trade receivables, the wizard may take up committed offers and compile the optimal sell-option to obtain a desired amount and maturity set of receivables as targeted by the treasurer.

Figure 10:
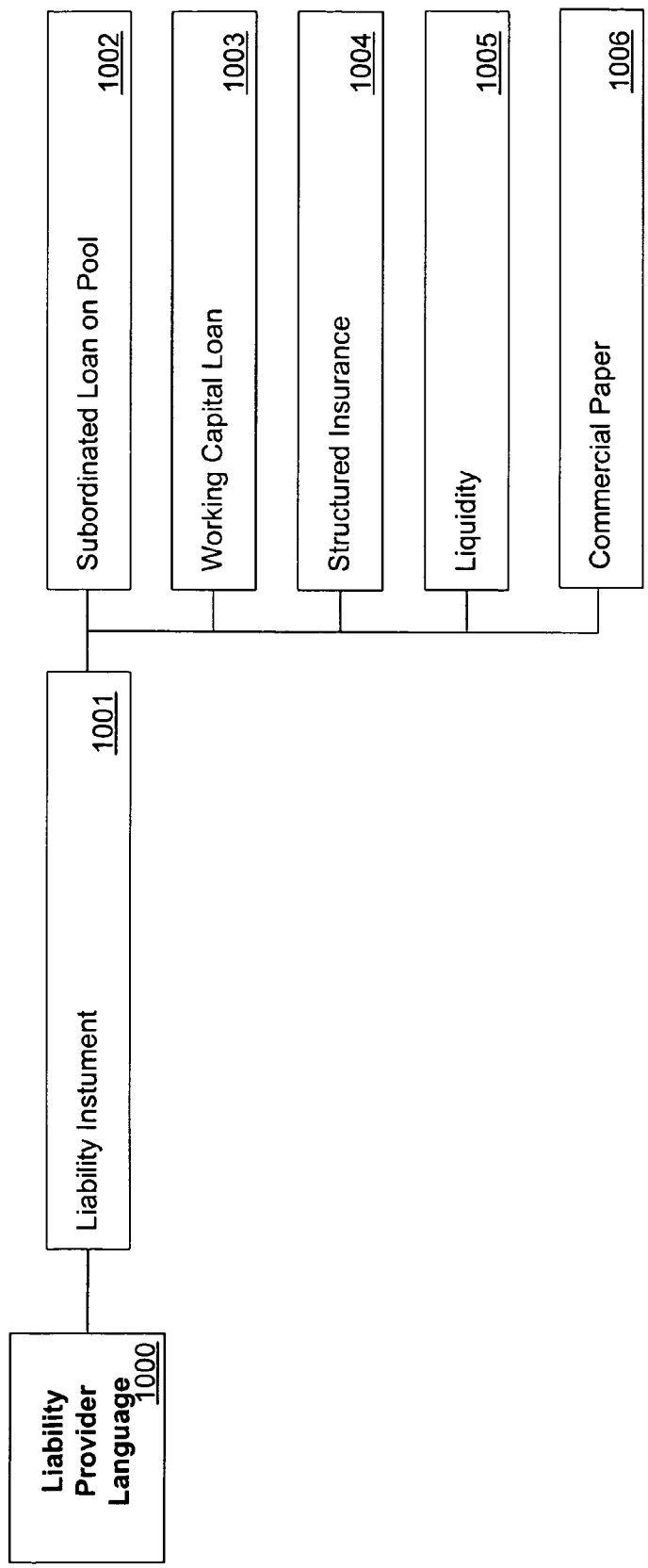

FIG. 10 is a hierarchy chart representing an exemplary Liability Provider Language component 1000 and its subcomponents, consistent with an embodiment of the invention. As shown, the Liability Provider language component 1000 may include a Liability subcomponent 1001 that creates liability models for each liability instrument type utilized in financing and insuring a portfolio. Liability instruments may either be on or off balance sheet. The group of liability instruments, which finance a portfolio, may in a preferred embodiment provide the complete financing and insurance of the portfolio.

In one embodiment consistent with the invention, liabilities are issued in bundles and a single plug-in module is created for each bundle. An example of such a bundle of liabilities consisting of a commercial paper issue always combined with a matching foreign exchange swap. In one embodiment, a plug-in module may cover multiple liability facilities provided by separate facility providers. As an example, two similar liquidity facilities provided by separate facility providers are treated as one, or two similar commercial paper-programs with different names are treated as a single program.

Liability Instrument modules when plugged in specify the risk they may absorb or the funding they may provide and the other conditions attached to those instruments. Based on the various liability instrument types provided for a portfolio the liability instrument 1001 generates a model how cash received from the assets is to be paid to the liability providers, a model how losses occurring on the asset portfolio are to be allocated to the different facilities, a model to project the future cash flow of the liabilities currently financing the portfolio and a model how fees and interest of the liability instrument are to be allocated to a sell-option or a pool. All these models should allow for inverted calculation also in order for example to determine the all in finance cost on change of terms and conditions of one of the liability instruments.

In one embodiment consistent with the invention, a plug-in component allows an investor or facility provider to alter the terms and conditions of the future usage of the instruments or future instances of the instruments through the facility provider computer 15. In another embodiment consistent with the invention, a plug-in component generates reports to assist in managing the risk of an instrument in the context of a total portfolio, where the portfolio can include any investor assets, including assets unrelated to the FI system, such as stocks, bonds, and mutual funds.

In one embodiment, instances of liability plug-in modules represent specific funding instruments. A specific funding instrument plug-in may provide (limited) funding or insurance in the context of the all the portfolio of assets insured, financed, and hedged by a community of corporations, or it may provide support limited to a subset of assets defined using the pool management subcomponent 9401. For example, with respect to the pool management subcomponent 9401 (described above), an instance of the liability plug-in 1001 may provide support limited to currencies, lenders, pools, debtors, or individual assets, such as individual receivables.

In one embodiment consistent with the invention, the Liability subcomponent 1001 comprises several subcomponents that may apply to trade receivable liabilities. For example, a Subordinated Loan on Pool subcomponent 1002 represents a plug-in liability module for an instrument that can provide first loss support, up to an absolute amount, on a specific pool of trade receivable assets. The loan is therefore subordinated and absorbs liquidity as credit risk. In one embodiment, the treasurer and/or an administrator will provide the subordinated loan, which may give these entities an incentive to administer the pool assets well. In another embodiment, the Subordinated Loan on Pool subcomponent 1002 allows a user to set the interest rate and limit on this instrument, provides tools for treasurers to determine a fair price for the instrument, and/or generates reports for investors regarding loss and exposure distribution for the instrument.

A Working Capital Loan subcomponent 1003 represents a plug-in liability module for an instrument that provides funding to the portfolio, which may be altered on a daily basis and whereby the interest is typically calculated as a margin over the drawn amount. In one embodiment, the Working Capital Loan subcomponent 1003 allows a user to set the interest rate and limit on an instrument and generate reports for investors regarding commitments and expected cash flow for the instrument in the future.

A Structured Insurance subcomponent 1004 represents a plug-in liability module for an instrument that provides protection to a portfolio in case losses accumulate above a certain level usually expressed as a percentage of the portfolio. In one embodiment, the insurance provider may alter the price on new commitments arising under the policy through the facility provider computer and obtain risk reports on the actual risk absorbed by the insurance policy.

A Liquidity subcomponent 1005 represents a plug-in liability module for an instrument that guarantees the ability to draw funds, however stimulates not to use the facility. This type of instrument is generally used in order to ensure continued access to funds when liability instruments are used with fixed repayment dates such as commercial paper and certificate of deposit. In one embodiment, the liquidity provider has access through the facility provider computer to view the potential commitments of the facility, the probability of drawing under the facility and the amount expected to be drawn in this circumstance. In one embodiment, the liquidity provider has the ability to change the limit of potential commitments, the fees over potentially used facility portions and the fee of drawings under the facilities.

A commercial paper (CP) subcomponent 1006 represents a plug-in liability module for an instrument under which funding may be obtained for a number of days from capital market investors in return for a discount or an interest.

FIG. 11 is a hierarchy chart representing an exemplary Funding Options Optimization component 1100 and its subcomponents, consistent with an embodiment of the invention. Funding Options Optimization component 1100 may use the projections and the Liability Provider language component information to determine possible arrangements for financing a sell option in context of the portfolio. This procedure execution may be based on data among others regarding the portfolio, the existing liabilities, the committed, last, index, benchmark or extrapolated pricing, exposure distributions, and/or the availability of new liabilities. Algorithms that may be used in a procedure can be based on stochastic optimization, neural nets, numeric optimization or others. A possible arrangement for financing a pool of assets is referred to herein as a funding option. This procedure to determine a funding option may in a preferred embodiment be treated as a procedure 44 to the funding option goal 43 for the pool. One may consider a funding option as a translation or transformation from the Liability Provider Language for the various liabilities required in a funding option to the Treasurer Language. For a funding option the all-in financing cost (AFC) may be calculated, and typically the most attractive funding option is the one with the lowest AFC.

As shown in FIG. 11, Funding Options Optimization component 1100 may include a Create Funding Options subcomponent 1101. The Create Funding Options subcomponent may determine possible groups of facility and or investment that may compromise a funding option given the desire of the Treasurer or on the basis of the most recent pricing or by specifying the complete space of possible funding options.

A Procedure Selector Funding Option subcomponent 1102 may allow the treasurer to select from the various procedures available to calculate the funding options. Like for other procedures described above in one preferred embodiment, a procedure testing routine may be implemented, which may determine which procedure on average arrives at the lowest AFC and may advice or default this procedure to be used.

In the embodiment shown, a Typical Funding Option procedure 1103 may be implemented with several subcomponents.

For example, a Minimum Liability Requirements subcomponent 1104 may be provided to calculate the amount of the various liability instruments required in the set to finance a new sell option, ensuring that the proposed funding adheres to the requirements of the underlying instruments in terms of credit quality, amounts, and/or maturities which may be issued as set in the liability provider language step 38, among other things. The procedure will be executed on the basis of the results of the Project procedures described above; amongst others typically cash flow distributions, or loss distributions are utilized. In addition, subcomponent 1104 ensures that instruments that only support certain subsets of assets are treated correctly in coordination with the underlying Project procedure.

For a simple embodiment, with sub loan and working capital as liability instruments, the result of a funding option may be the amounts of each instrument to be drawn on acquiring the sell option. A more complex environment with additionally a Commercial Paper program as Liability Instrument may also calculate the amount per maturity of CP to be issued under the funding option in context of the portfolio.

Some Liability instruments, like typically liquidity and working capital, may have limits. The limit is the maximum usage of a Liability instrument. An Availability Checking subcomponent 1105 verifies the availability of the Liability instrument, if applicable for such Liability instrument, on the Liability instruments now and in the future of the transaction. If no limit space is available, this may be taken into account in the funding option procedure. Other types of limits, like limits on the probability an instrument may take a hit on a portfolio or pool, may also be accommodated within embodiments of the current invention.

A Get Pricing subcomponent 1106 obtains pricing levels of the Liability instruments allocated or identified. For Liabilities instruments that are or have been committed (like typically a liquidity facility) at a pricing level, this may be the actual pricing of the liability instrument. For un-committed liabilities (like a Commercial Paper issue without a current commitment), either the most recent market pricing is utilized (which may be an extrapolated price), or an index or comparable CP program is utilized, if it is a better price indicator by market standards or any other way of estimating the expected pricing.

An Optimal Taking Price subcomponent 1107 or the funding option procedure based on the minimum Liability requirements 1104, availability 1105, Pricing 1106, calculates the optimal combination of Liability instruments to minimize the AFC.

A Fees subcomponent 1108 may also be provided to add applicable fee(s) to the price. The fee may be a function of any parameter of the assets or the liabilities associated with a sell option/funding option combination, and can also be based on other factors, including time and human factors. Furthermore, if the liability or the risk transfer legal methodology has tax implications, these may be added to or subtracted from the fees.

As further shown in FIG. 11, a Calculate Cost subcomponent 1109 may be provided. This subcomponent may produce the AFC of the sell funding option combination. If the funding option utilizes only committed liabilities, the final price will be firm and the sell funding option combination may be executed by the Treasurer or is automatically executed depending on the sale method.

In one embodiment consistent with the invention, multiple funding options are generated for a sell option. For instance, a treasurer may vary the amount of subordinated loan, liquidity, or other desired support for his or the community's pool (s), may compare the (optimal) funding options produced by multiple procedures, and/or may review funding options as time passes and change the relative benefits and attractiveness of the options.

Another embodiment of a funding option procedure may be used to calculate the AFC, which it would cost to finance the complete pool or portfolio on a day. This may be implemented with a Marked to Market subcomponent 1110. On this AFC calculation, the Dis-aggregation procedure described below may be applied, resulting in the current AFC of an asset. Under such approach the sum of the AFC of the asset in the pool or portfolio is the AFC of the pool or portfolio.

An Accrual subcomponent 1111 may calculate the amount of cost of Liability Instruments was incurred on a pool or portfolio within a historic period of time. The testing routine of the funding option procedure may compare the accrual cost with the AFC projected by the procedure at the start of the period.

A Dis-aggregation subcomponent 1112 can disaggregate the AFC of the funding option to the individual assets. Various procedures may be used to disaggregate the costs, such as an algorithm based on risk contribution of the asset to the portfolio. Under this algorithm, the sum of the AFC of the asset is equal to the AFC of the sell option assets.

Figure 12:
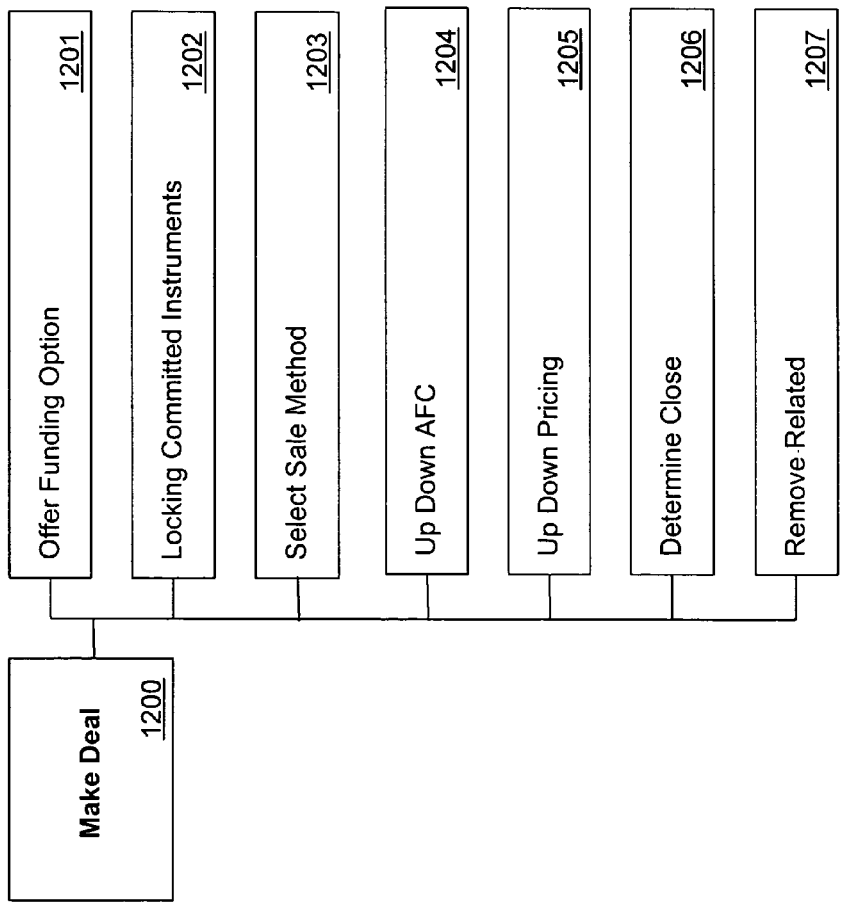

FIG. 12 is a hierarchy chart representing an exemplary Make Deal component 1200, consistent with an embodiment of the invention. Make Deal component 1200 may include several subcomponents. For example, an Offer Funding Option subcomponent 1201 may be provided to allow a treasurer to select from a multiple of funding options for one or many sell option created by Funding Options Optimization component 1100.

In case all the Liability Instruments amounts underlying the funding option selected are committed and available, the offer may be immediately executed after the offer at the committed pricing as further described in Deal Execution 1300. After the treasurer has offered the selected funding option, if all the underlying instruments are committed at the price entered by the treasurer, then a Remove Related subcomponent 16809 may perform its functions (see description below).

If, however, there is a non-committed instrument in the funding option, then a sale method (for example, method 1203) may be executed to obtain committed offers from all uncommitted liability instrument providers.

Locking Committed Instruments subcomponent 1202 may lock the potential future usage of committed Liability instruments required for a funding option when a funding option is offered by a treasurer. The locked amount of a Liability Instrument may not be used for other funding options. If multiple sell-options of which funding options have been offered are overlapping, the largest potential usage of the Liability instrument is locked. At the point the deal is closed the locked limit space will be utilized. If the deal is withdrawn or cancelled, the locked space is released and may be used by other funding options.

A Select Sale Method subcomponent 1203 allows a treasurer to select from methods of offering the funding option. An example of a sale method is one whereby bids are requested, and the Treasurer has to select the bid won. Another example is one whereby the Treasurer indicates a minimum AFC or other Terms at which he commits to execute the Deal once a funding option is found which matches this AFC (limit orders). Other conventional methods known in the art may also be used as examples.

An Up Down AFC subcomponent 1204 allows a treasurer to raise or lower the AFC pricing from the initial offering price, which would typically be set based on the indicative price calculated by Funding Options Optimization component 1100, increasing or decreasing the likelihood that an investor will accept the current price. Note that a multiple of possibilities exist to close a deal when the price is changed consisting of changes in price of the various liability instruments.

An Up Down Pricing subcomponent 1205 enables Liability Instrument providers to increase or decrease the probability that the Liability Instrument will be used in offered funding options. In one embodiment, the increase or decrease of the pricing may be done for a maximum amount of the Liability Instrument.

A Determine Close subcomponent 1206 closes a deal when all liabilities required for a funding option are committed and the Treasurer commits the funding option. Closing may be done in certain sale methods when the treasurer checks the offer button or if the treasurer was committed when the Liability Provider indicates a commitment, which completes the requirement of the funding option. When a funding offer is closed the Deal Execution component 1300 may be initiated.

A Remove Related subcomponent 1207 cancels offers for funding options in near real-time when there is overlap in assets between a filled funding option(s) and an offered funding option(s). On the Liability Instrument Provider side, the cancelled offers may be removed in near real time from the screens of the Liability Instrument Providers.

Figure 13:
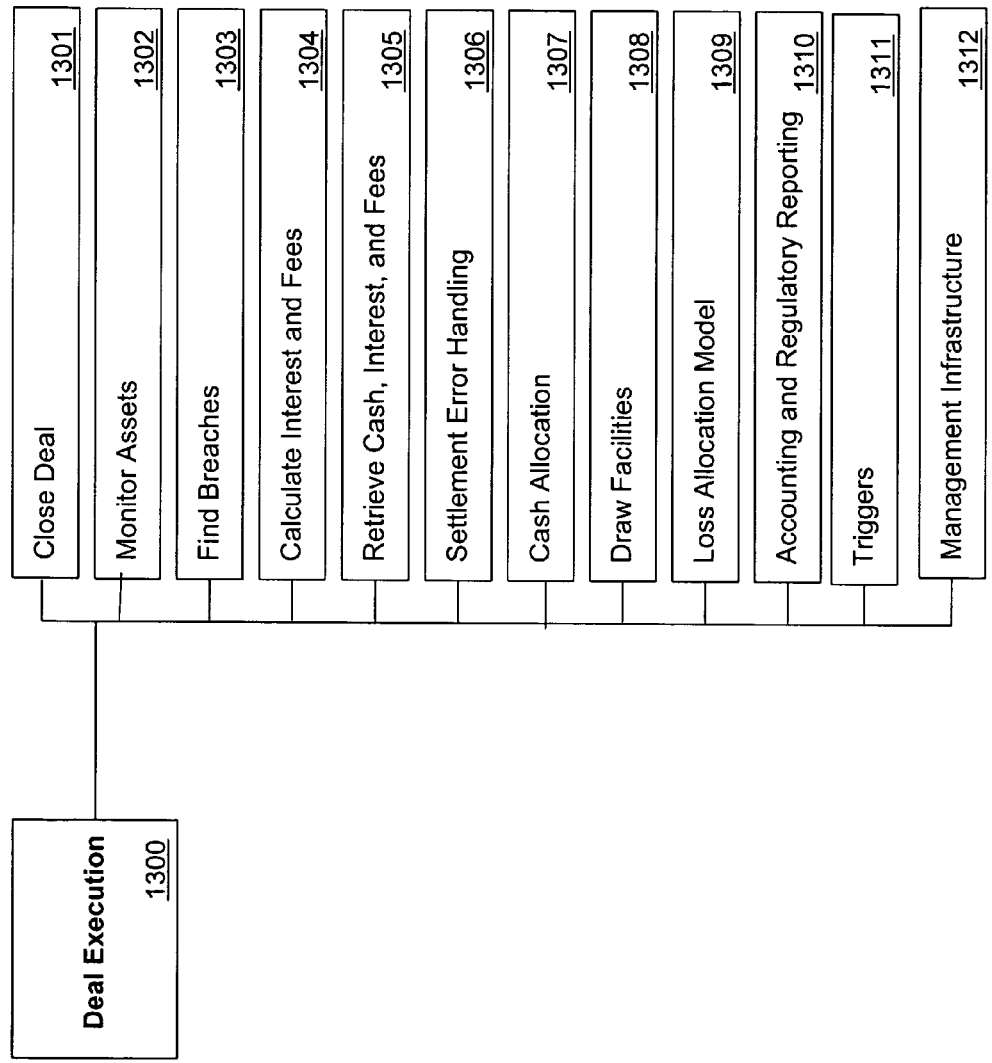

FIG. 13 is a hierarchy chart representing an exemplary Deal Execution component 1300. After a deal is made, a Close Deal subcomponent 1301 of the Deal Execution component 1300 may purchase the assets for the funding company 28 or execute other legal methods of funding, may send a report to the treasurer regarding the execution, issue or allocate the required Liability Instruments, and/or initiate settlement of the sale and purchase and the Liability Instruments. In one embodiment consistent with the invention, this component also prints out or otherwise facilitates preparation of hardcopy contracts for the transaction if so required.

A Monitor Assets subcomponent 1302 monitors the status of the assets funded in the portfolio. For example, the subcomponent monitors the quality and price of the asset as well as the particular status this instance of the asset is moving though. As an example for a Trade Receivable, it may be open, overdue, default, written off, dispute, diluted, partly paid or paid and various other potential statuses.

A Find Breaches subcomponent 1303 monitors the data underlying the deal during the life of the deal. If changes occur on financed or insured data which are not permitted under the terms of the deal, the asset management infrastructure will generate a 'breach' payment and related payment instructions so automatically executing the warranties provided by the Treasurer.

A Calculate Interest and Fees subcomponent 1304 calculates interest and fees, if applicable for the Liability Instrument and services, during the life of the arrangement.

A Retrieve Cash, Interest, and Fees subcomponent 1305 retrieves cash from the treasurers in a deal according to the contracts by creating payment instructions and may be direct debit instructions. In one embodiment, direct debit instructions are made at least on a daily basis and integrate amounts owed due to the assets involved in the arrangement, such as, in the case of trade receivables, actual repayment, dilution, breaches, interest, or other cash flows. In one embodiment of the Retrieve Cash, Interest, and Fees subcomponent 1305, if data is not received to determine the amount of money to be retrieved that day, the subcomponent will calculate and retrieve the expected amount of money as calculated using a preferred procedure. When new data is received, the Settlement Error Handling subcomponent 1306 may make good any differences between the expected amount retrieved and actual amount due.

A Cash Allocation subcomponent 1307 calculates to which Liability provider(s) or service provider(s) cash that is received by the funding company 28 must be paid using the definition of the Liability Instruments provided in the Liability Providers language and creates the related payment instructions and the amount of cash that the Liability Providers need to pay the funding company.

A Loss Allocation Model subcomponent 1309 determines actual losses incurred by the Liability Instruments and cancels exposure of these instruments against the loss or draws for the amount of loss.

An Accounting and Regulatory Reporting subcomponent 1310 may create all reports and other output required by regulatory agencies.

A Triggers subcomponent 1311 may trigger certain effects if a measure exceeds predetermined limits. Measures may be data provided to FI or results of procedures. For example, in the case of trade receivables measures may include: the rating of the treasurer or administrator falls below a predetermined level, dilution ratio on a pool exceeding a predetermined level, the lack of timely data, the nonperformance of audits, and others. Multiple limits may be set on a single measure. Trigger effects may include inability to obtain more funding or insurance, the right to onward sell the assets in the pool, a takeover of the servicing of the assets, assistance in servicing the assets, a cancellation of any further asset purchases, a direct debit of the cash owed, penalty payments, and/or other actions.

A Management Infrastructure subcomponent 1312 may provide services and tools to maintain and support the FI system and to provide quality checks. In one embodiment, these services include data maintenance, interface maintenance, user maintenance, financial reporting, risk reporting to rating agencies, regulators, and investors, treasury issuance facilities, contract reconciliation, settlement error solving, help functionality, account opening facilities, and/or risk engine upgrade methodologies, among others.

As disclosed herein, embodiments of the invention may be automated through computerized systems and methods. To facilitate data entry and analysis by users, including treasurer, various user interfaces may be implemented. In one embodiment, such interfaces may be embodied as graphical user interfaces that are generated on a user's computer or terminal using a browser or other suitable application.

Figure 14:
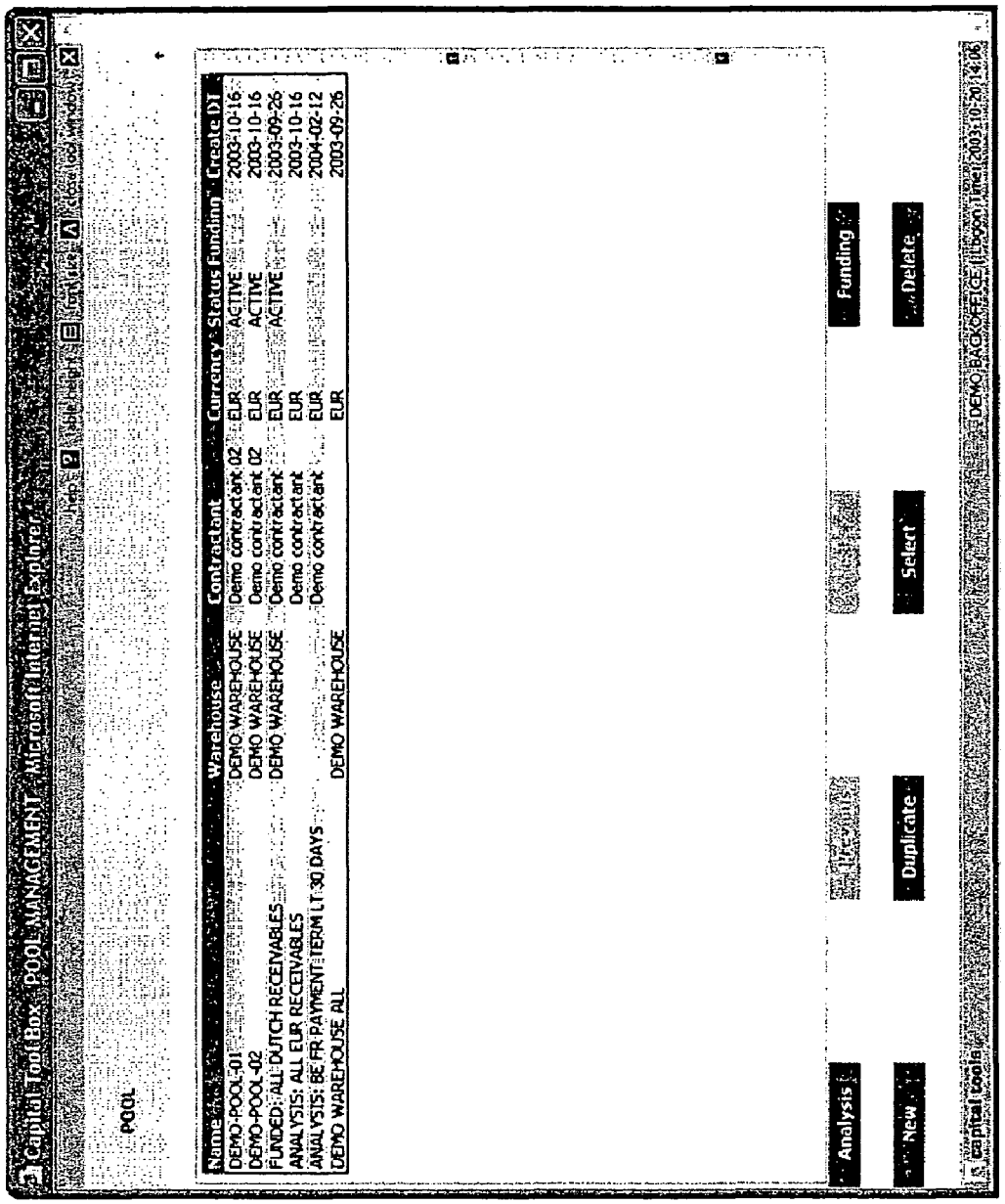
FIG. 14 illustrates an exemplary user interface for pool management, consistent with the invention.
Figure 15:
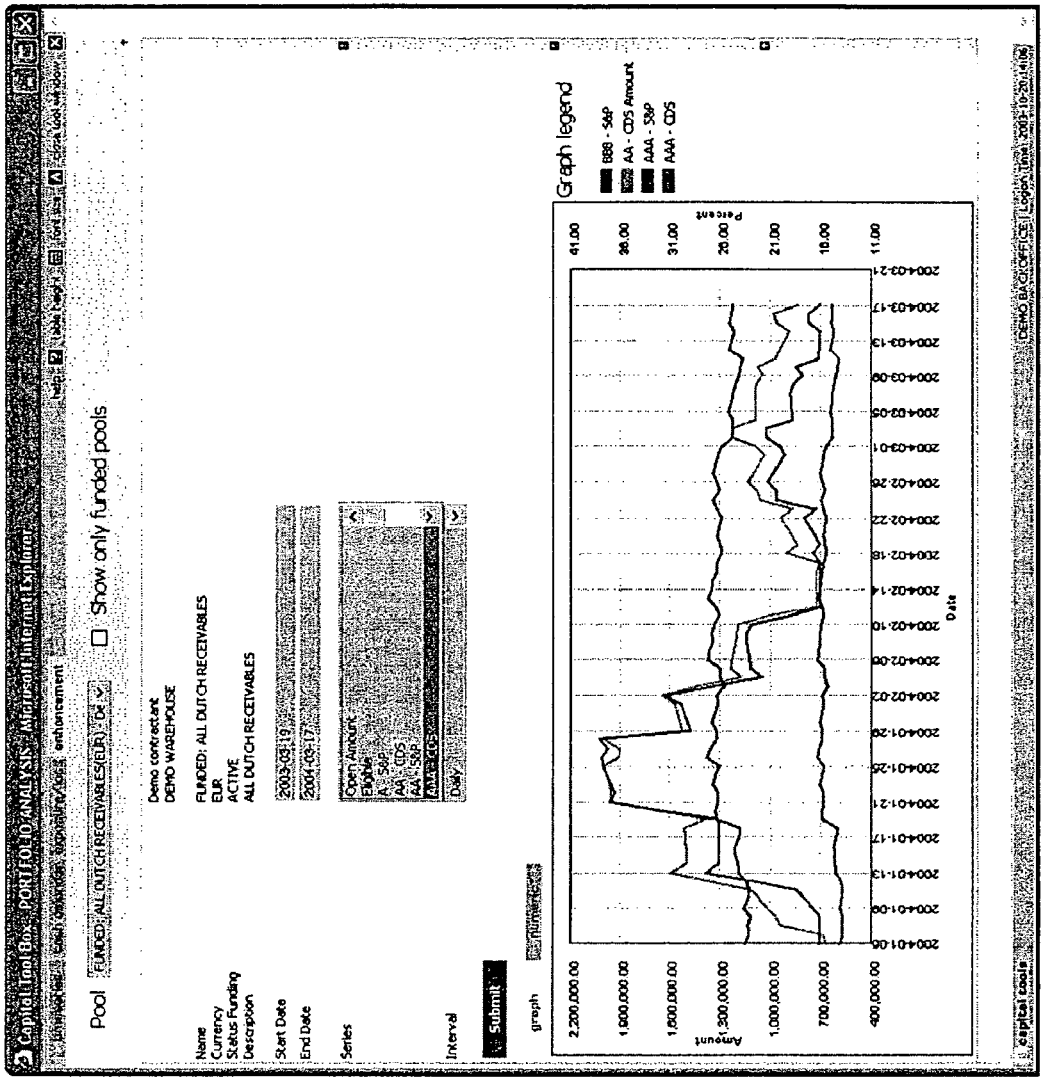
FIG. 15 illustrates another exemplary user interface for pool management and analysis, consistent with the invention.
Figure 16:
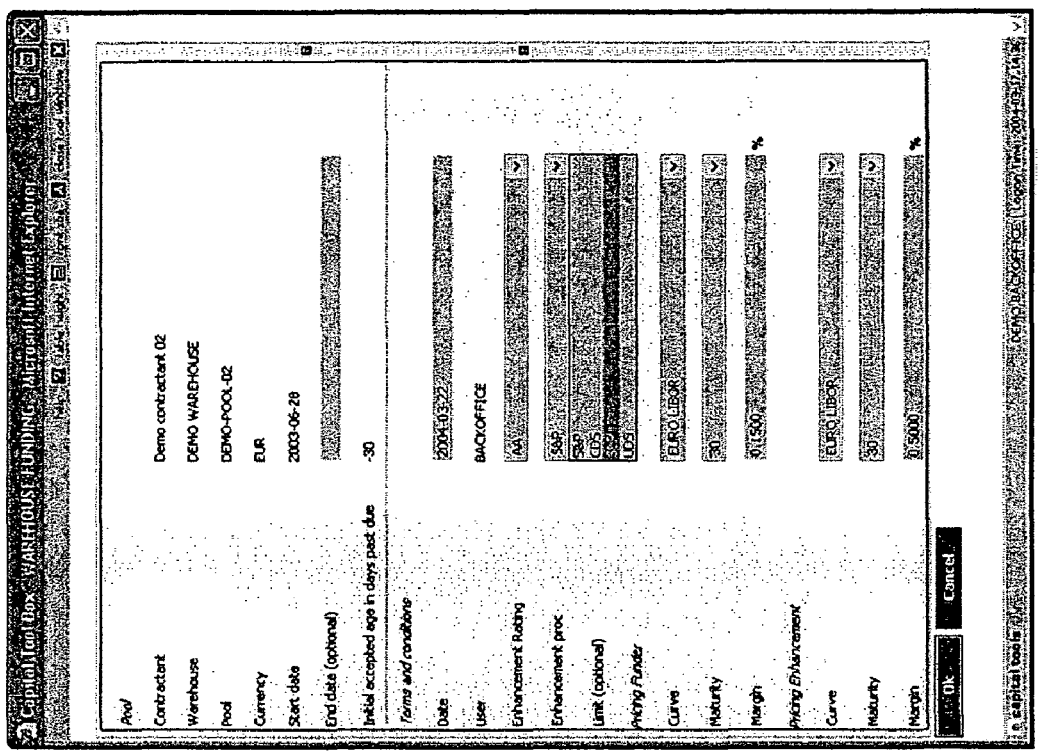
FIG. 16 illustrates an exemplary user interface for setting the terms and conditions on a pool of assets, consistent with the invention.

By way of example, FIGS. 14-16 illustrates exemplary user interfaces that may be implemented with embodiments of the invention. Such interfaces may provide, among other things, an overview of portfolios or pools of assets (see, for example, FIG. 15). Information concerning the pools may be organized into a table, with relevant data, such as the name of the asset, the name of the originator of assets, the treasurer, the currency, the status of funding and start date of the pool. In one embodiment, a user interface may list funded pools, analysis pools and pools under offer (see, for example, FIG. 14). Additionally, or alternatively, in the case of a Liability Provider who has logged into the system, the user may only be permitted to see the pools the financier has financed and the pools that have been offered to that financier for financing.

In the example of FIG. 15, the user interface shows the analysis of particular pool or portfolio of assets. The particular pool to be analyzed may be selected by the user through an interface screen, such as that of FIG. 14, and/or a dropped down menu or list may be provided with the interface of FIG. 15 to facilitate selection. Analytical information may be presented in any combination of text, graphic and/or numeric format. Further, the analytical information may be grouped for presentation and selected by the user using tabs or other screen elements.

In the example of FIG. 15, four tabs are provided, including: timeseries; cash calendar; exposure loss distribution; and enhancement. The timeseries tab may provide a basis analysis for the user of the history of the pool. The case calendar tab may provide projections of the future cash provided by the pool. The exposure loss distribution tab, if selected by the user, may provide the risk of the pool now and also in the past. Finally, the enhancement tab may provide additional analytical information such as a history of the risky ness of the pool. In one embodiment, the history of the pool may be viewed for various risk methodologies, such as S&P, CDS and BIS II, and for various enhancement rating levels, such as AAA, AA, BBB, etc. FIG. 15 illustrates that the enhancement goal has been calculated by multiple procedures, either known in the art (S&P), provided by regulators (BISII) or provided by other parties, for a historic period of time.

FIG. 16 provides another simple example of a user interface, consistent with the present invention. In the embodiment of FIG. 16, a user interface is provided that indicates the terms and conditions for a particular pool of assets (again selectable through the interface of FIG. 14 or some other selection screen or interface). The terms and conditions for a pool may include, for example, enhancement rating level and risk measurement methodology (procedure). Consistent with an embodiment of the invention, such terms and conditions as well others may be selectable and set for the pool by an investor or financier.

Other embodiments of the invention will be apparent to those skilled in the art from consideration of the specification and practice of the embodiments of the invention disclosed herein. While aspects of the invention have been described with reference to specific embodiments, the description is intended to be illustrative of the invention and is not intended to be limiting. Therefore, it is intended that the specification and examples be considered as exemplary only, with a true scope and spirit of the invention being indicated by the following claims.

What is claimed is:

1. A computer-implemented method to optimize a financing of additional assets, that may be added into a pool of assets, using at least one liability instrument, wherein the pool of assets is within a financed asset portfolio, the method comprising:

obtaining data on the assets in the pool of assets from a treasurer and from the financed asset portfolio;

storing, in a memory device, the data obtained for the assets in the pool of assets and in the financed asset portfolio;

learning, with a processor, a behavior of the assets in the pool of assets and the financed asset portfolio based on the data obtained, wherein learning comprises estimating a cash flow distribution originating from the assets in the pool of assets and in the financed asset portfolio;

creating a sell option for the pool of assets, the sell option comprising the additional assets, which are held by the treasurer and which may be added to the pool of assets in the financed asset portfolio;

projecting, by the processor, future cash flows of the financed asset portfolio with and without the additional assets in the sell option based on the behavior learned;

determining a set of possible funding options to fund the sell option, wherein each possible funding option comprises at least one liability instrument; and presenting the set of possible funding options to a user on a display device.

2. The method of claim 1, wherein creating a sell option comprises:

creating a sell option using at least one technique from a group comprising: actuarial pool rules, manual interfaces, and random selection.

3. The method of claim 1, further comprising executing a plug-in procedure to perform at least one of:

estimating cash flow distribution for the pool of assets;

estimating cash flow distribution for the financed asset portfolio; or estimating cash flow distribution for the at least one liability instrument.

4. The method of claim 1, wherein determining a set of possible funding options comprises:

calculating an All-in Finance Cost (AFC) for each funding option in the set.

5. The method of claim 4, further comprising:

calculating the AFC for each funding option in the set based on at least one form of liability instrument pricing, chosen from the group comprising: committed pricing, latest pricing, extrapolated pricing, and indexed pricing.

6. The method of claim 1, wherein presenting the set of possible funding options comprises:

receiving at least one funding-option characteristic desired by a user;

determining an optimal funding option based on the at least one desired characteristic; and presenting the optimal funding option to at least one user.

7. The method according to claim 1, wherein at least one of the steps of learning the behavior of the assets, projecting future cash flows of the financed asset portfolio, and determining a set of possible funding options is performed using at least one plug-in procedure, the plug-in procedure being adapted to run simultaneously with other plug-in procedures.

8. The method according to claim 7, further comprising:

running a test procedure on a goal to determine the adequacy of the at least one plug-in procedure.

9. The method according to claim 8, wherein the test procedure uses at least one of: benchmarking and historic performance.

10. The method according to claim 7, further comprising:

analyzing at least one of: a current effect and a historical effect; and choosing an optimal plug-in procedure based on the comparing.

11. The method according to claim 8, further comprising:

selecting a plug-in procedure for a deal or goal based on a result of the test procedure.

12. The method of claim 7, further comprising:

determining a set of possible goals using at least one plug-in procedure;

wherein each goal of the set of possible goals is further subdivided into goals with tests and plug-in procedures, which may be selected by the user.

13. The method of claim 7, further comprising:

prohibiting changes to a plug-in procedure after the plug-in procedure is used by at least one user.

14. The method of claim 13, further comprising:

prohibiting changes to a test procedure after the test procedure is used by at least one user.

15. The method of claim 1, further comprising:

expressing a future performance of the pool of assets as a cash flow distribution.

16. The method of claim 1, further comprising:

closing an open pool of assets, wherein no further sell options may be added.

17. The method of claim 1, wherein creating a sell option comprises:

periodically creating a sell option based on an actuarial pool rule and a target set by a treasurer.

18. The method of claim 1, wherein determining a set of possible funding options comprises:

calculating an All-in Finance Cost (AFC) of a possible funding option in the set by summing a cost of each liability instrument and a service fee.

19. The method of claim 18, wherein the cost of each liability instrument is at least one of: a committed price, a recent executed price, an index-based price, an extrapolated price, and an estimated price.

20. The method of claim 1, wherein the at least one liability instrument comprises:

a liability instrument that supports a subset of the assets in the portfolio.

21. The method of claim 20, wherein the subset is one of: a pool, an individual asset, or a group of individual assets.

22. The method of claim 6, further comprising:

determining an optimal combination of a sell option and a funding option based on an optimization target set by a treasurer and an optimization target set by a liability provider; and presenting the optimal combination to at least one user.

23. The method of claim 22, wherein the optimization target set by a treasurer is an All-in Finance Cost (AFC), and wherein the optimization target set by the liability provider is a desired terms and conditions constraint.

24. The method of claim 22, wherein the optimization target is at least one of: multiple optimization targets set by the treasurer, or multiple optimization targets set by the liability provider.

25. The method of claim 1, wherein determining a set of possible funding options comprises:

determining at least one characteristic for a funding option from the group comprising: an amount of exposure, an amount of risk, a return, and a value indicator; and wherein presenting the set comprises:

presenting the determined characteristic to the user.

26. The method of claim 7, further comprising: using a plug-in procedure to find a funding option with a characteristic specified by the user and to request the at least one liability instrument associated with the found funding option from at least one liability provider for each liability instrument.

27. A computer readable medium storing program instructions which, when executed by a processor, optimize a financing of additional assets, that may be added to a pool of assets, using at least one liability instrument, wherein the pool of assets is within a financed asset portfolio, the program instructions comprising program instructions adapted to perform the following when executed by a processor:

creating a sell option for the pool of assets, the sell option comprising the additional assets, which are held by a treasurer and which may be added to the pool of assets in the financed asset portfolio;

projecting future cash flows of the financed asset portfolio with and without the additional assets in the sell option based on behavior learned about the assets in the pool of assets and in the financed asset portfolio, wherein the behavior learned includes an estimated cash flow distribution originating from the assets in the pool of assets and in the financed asset portfolio;

determining a set of possible funding options to fund the sell option, wherein each possible funding option comprises at least one liability instrument; and presenting the set of possible funding options.

28. The computer readable medium of claim 27, further comprising program instructions that are adapted to perform at least one of the following when executed by a processor:

estimating cash flow distribution for the pool of assets;

estimating cash flow distribution for the financed asset portfolio; or estimating cash flow distribution for the at least one liability instrument.

29. The system computer readable medium of claim 27, wherein presenting the set of possible funding options comprises:

receiving at least one funding-option characteristic desired by a user;

determining an optimal funding option based on the at least one desired characteristic; and presenting the optimal funding option to at least one user.

30. The computer readable medium of claim 27, wherein at least one of the projecting future cash flows of the financed asset portfolio, and determining a set of possible funding options is performed simultaneously with other procedures.

31. The computer readable medium of claim 30, further comprising program instructions that are adapted to perform the following when executed by a processor:

running a test procedure on a goal to determine the adequacy of the at least one plug-in procedure.

32. The computer readable medium of claim 29, further comprising program instructions that are adapted to perform the following when executed by a processor:

determining an optimal combination of a sell option and a funding option based on an optimization target set by the treasurer and an optimization target set by the liability provider; and presenting the optimal combination to at least one user.

* * * * *